(12) United States Patent
Isono

(10) Patent No.: US 9,181,998 B2
(45) Date of Patent: Nov. 10, 2015

(54) DISC BRAKE DEVICE AND CALIPER SLIDE MECHANISM

(75) Inventor: Hiroshi Isono, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 56 days.

(21) Appl. No.: 14/124,130

(22) PCT Filed: Jun. 7, 2011

(86) PCT No.: PCT/JP2011/063081
§ 371 (c)(1),
(2), (4) Date: Dec. 5, 2013

(87) PCT Pub. No.: WO2012/169018
PCT Pub. Date: Dec. 13, 2012

(65) Prior Publication Data
US 2014/0116815 A1    May 1, 2014

(51) Int. Cl.
*F16D 65/18*    (2006.01)
*F16D 65/00*    (2006.01)
*B60T 1/06*    (2006.01)
*F16D 55/2265*    (2006.01)
*F16D 55/227*    (2006.01)

(52) U.S. Cl.
CPC ............. *F16D 65/0006* (2013.01); *B60T 1/065* (2013.01); *F16D 55/227* (2013.01); *F16D 55/22655* (2013.01); *F16D 65/0068* (2013.01)

(58) Field of Classification Search
CPC .............. F16D 65/006; F16D 65/0012; F16D 65/0068; F16D 55/2265; F16D 55/22655; F16D 55/227

USPC ................................. 188/73.35, 73.44, 73.45
See application file for complete search history.

(56) References Cited

U.S. PATENT DOCUMENTS 4,334,599 A * 6/1982 Ritsema et al. ............ 188/73.45
5,526,904 A * 6/1996 Walden et al. ............. 188/73.45
(Continued)

FOREIGN PATENT DOCUMENTS

JP    54144556 A  * 11/1979
JP    7 14232        3/1995
(Continued)

OTHER PUBLICATIONS

International Search Report Issued Sep. 13, 2011 in PCT/JP11/063081 Filed Jun. 7, 2011(with Partial English translation).

*Primary Examiner* — Thomas J Williams
(74) *Attorney, Agent, or Firm* — Oblon, McClelland, Maier & Neustadt, L.L.P.

(57) ABSTRACT

A disc brake device includes: a disc rotor rotating around a rotational axial line; a friction pad facing a friction surface of the disc rotor; a caliper capable of pressing the friction pad to the friction surface of the disc rotor; a mounting provided with the caliper; and a caliper slide mechanism supporting the caliper on the mounting in a manner enabling slide movement via a slide pin inserted in a guide section provided in a hole section of the caliper or the mounting, in which the caliper slide mechanism has a variable mechanism making a permissible swing angle of the slide pin with respect to a slide movement direction variable in response to a braking action along with slide movement of the caliper. Accordingly, the disc brake device and the caliper slide mechanism can provide an effect of reducing noises.

9 Claims, 8 Drawing Sheets

(56) References Cited

U.S. PATENT DOCUMENTS

| | | | |
|---|---|---|---|
| 7,337,881 B1 * | 3/2008 | Sherman, II | 188/73.45 |
| 8,783,425 B2 * | 7/2014 | Isono et al. | 188/73.44 |
| 2006/0049008 A1 * | 3/2006 | Kinoshita et al. | 188/73.45 |
| 2011/0278104 A1 | 11/2011 | Isono et al. | |

FOREIGN PATENT DOCUMENTS

| | | |
|---|---|---|
| JP | 08 145088 | 6/1996 |
| JP | 2005 220942 | 8/2005 |
| JP | 2006 161826 | 6/2006 |
| JP | 2010 255712 | 11/2010 |

* cited by examiner

SLIDE MOVEMENT DIRECTION
(ROTATIONAL AXIAL LINE DIRECTION)

CLEARANCE (AXIS × ELASTIC BODY)

DISC BRAKE DEVICE AND CALIPER SLIDE MECHANISM

TECHNICAL FIELD

The present invention relates to a disc brake device and a caliper slide mechanism.

BACKGROUND ART

As a conventional disc brake and a caliper slide mechanism, for example, Patent Document 1 discloses a pin slide type disc brake in which a slide pin is fixed to an ear portion of a caliper by a bolt that passes through the ear and screwed in the slide pin, the slide pin is inserted in a pin hole of a support member, and the caliper is thereby supported slidably in the disc axial direction. In the pin slide type disc brake, a slit is provided on an end surface on a slide pin mounting side of the ear of the caliper, a head portion of the slide pin that has two parallel flat surfaces is arranged in the slit, and the flat surfaces of the slit that face each other thereby prevent rotation of the slide pin.

PRIOR ART DOCUMENT

Patent Document

Patent Document 1: Japanese Patent Application Publication No. 2005-220942 (JP 2005-220942 A)

SUMMARY OF THE INVENTION

Problem to be Solved by the Invention

However, there is room for further improvement in noise reduction, for example, in such an above-described pin slide type disc brake disclosed in Patent Document 1.

The present invention has been made in consideration of such a circumstance, and an object thereof is to provide a disc brake device and a caliper slide mechanism that can reduce noise.

Means for Solving the Problem

To achieve the above object, a disc brake device in accordance with the present invention includes: a disc rotor which rotates around a rotational axial line; a friction pad which faces a friction surface of the disc rotor; a caliper which is capable of pressing the friction pad to the friction surface of the disc rotor; a mounting in which the caliper is provided; and a caliper slide mechanism which supports the caliper on the mounting in a manner enabling slide movement via a slide pin inserted in a guide section provided in a hole section of the caliper or the mounting, in which the caliper slide mechanism has a variable mechanism which makes a permissible swing angle of the slide pin with respect to a slide movement direction variable in response to a braking action along with slide movement of the caliper.

Further, in the disc brake device, the variable mechanism can make the permissible swing angle in a braking state where the friction pad is pressed to the friction surface of the disc rotor larger than the permissible swing angle in a non-braking state where the friction pad is separated from the friction surface of the disc rotor.

Further, in the variable mechanism in the disc brake device, the guide section can change to make the permissible swing angle variable in response to the braking action.

Further, in the disc brake device, the guide section can have two support parts that support both end sections of the slide pin to guide slide movement of the slide pin, and the variable mechanism can make the permissible swing angle variable by changing an interval between the two support parts of the guide section along the slide movement direction and make the interval in the braking state where the friction pad is pressed to the friction surface of the disc rotor shorter than the interval in the non-braking state where the friction pad is separated from the friction surface of the disc rotor.

Further, in the disc brake device, the variable mechanism can have a variable mechanism moving element in which one of the two support parts is provided and a variable mechanism pressure chamber which is supplied with a hydraulic medium and generates force to make the variable mechanism moving element approach the other of the two support parts.

Further, in the variable mechanism in the disc brake device, one of the support parts provided in the variable mechanism moving element can elastically support the slide pin, and a clearance between the variable mechanism moving element and the slide pin can be larger than a clearance between the other support part and the slide pin.

Further, in the disc brake device, the variable mechanism can have a communication path which allows a pressing pressure chamber which is supplied with the hydraulic medium and generates force to press the friction pad to the friction surface of the disc rotor and the variable mechanism pressure chamber to communicate with each other via an inside of the slide pin.

Further, in the disc brake device, the caliper slide mechanism can have a positioning mechanism which is capable of changing relative positions of a sleeve in which the hole section is provided and the slide pin.

Further, in the disc brake device, the positioning mechanism can have: a elastic member which is interposed between the slide pin and the sleeve and is capable of compressive deformation in a braking state where the friction pad is pressed to the friction surface of the disc rotor; a positioning mechanism moving element which is interposed between the slide pin and the sleeve and is moveable along the slide movement direction following deformation of the elastic member; and a positioning mechanism pressure chamber which is supplied with a hydraulic medium which generates force to press the friction pad to the friction surface of the disc rotor and generates force to move the positioning mechanism moving element along the slide movement direction, and can permit relative movement between the slide pin and the positioning mechanism moving element or between the sleeve and the positioning mechanism moving element when compressive deformation of the elastic member reaches a preset prescribed value to change relative positions of the slide pin and the sleeve.

Further, in the disc brake device, the guide section can have two support parts that support both end sections of the slide pin to guide slide movement of the slide pin, and the variable mechanism can make the permissible swing angle by changing a clearance between at least one of the two support parts of the guide section and the slide pin and make the clearance in the braking state where the friction pad is pressed to the friction surface of the disc rotor wider than the clearance in the non-braking state where the friction pad is separated from the friction surface of the disc rotor.

Further, in the disc brake device, the guide section can have two support parts that support both end sections of the slide pin to guide slide movement of the slide pin, and the variable mechanism can make the permissible swing angle variable by changing rigidity of at least one of the two support parts of the guide section and make the rigidity in the braking state where the friction pad is pressed to the friction surface of the disc rotor lower than the rigidity in the non-braking state where the friction pad is separated from the friction surface of the disc rotor.

To achieve the above object, a disc brake device in accordance with the present invention includes: a disc rotor which rotates around a rotational axial line; a friction pad which faces a friction surface of the disc rotor; a caliper which is capable of pressing the friction pad to the friction surface of the disc rotor; a mounting in which the caliper is provided; and a caliper slide mechanism which supports the caliper on the mounting in a manner enabling slide movement via a slide pin inserted in a guide section provided in a hole section of the caliper or the mounting, wherein the guide section has two support parts that support both end sections of the slide pin to guide slide movement of the slide pin, and in the caliper slide mechanism, the guide section changes in response to a braking action along with slide movement of the caliper.

To achieve the above object, a disc brake device in accordance with the present invention includes: a disc rotor which rotates around a rotational axial line; a friction pad which faces a friction surface of the disc rotor; a caliper which is capable of pressing the friction pad to the friction surface of the disc rotor; a mounting in which the caliper is provided; and a caliper slide mechanism which supports the caliper on the mounting in a manner enabling slide movement via a slide pin inserted in a guide section provided in a hole section of the caliper or the mounting, wherein the guide section has two support parts that support both end sections of the slide pin to guide slide movement of the slide pin, and the caliper slide mechanism makes variable an interval between the two support parts of the guide section along the slide movement direction in response to a braking action along with slide movement of the caliper.

To achieve the above object, a caliper slide mechanism in accordance with the present invention is a caliper slide mechanism, in which a caliper is supported by the mounting in a manner enabling slide movement via a slide pin inserted in a guide section provided in a hole section of the mounting, and the caliper slide mechanism has a variable mechanism which makes a permissible swing angle of the slide pin with respect to a slide movement direction variable in response to a braking action along with the slide movement of the caliper.

Effect of the Invention

The disc brake device and the caliper slide mechanism in accordance with the present invention can provide an effect of reducing noises.

MODES FOR CARRYING OUT THE INVENTION

Embodiments in accordance with the present invention will be described hereinafter in detail with reference to drawings. It should be noted that the present invention is not limited by the embodiments. Further, the embodiments described below include structural elements that can be or are easily substituted by persons skilled in the art or that are substantially the same.

[First Embodiment]

Figure 1:
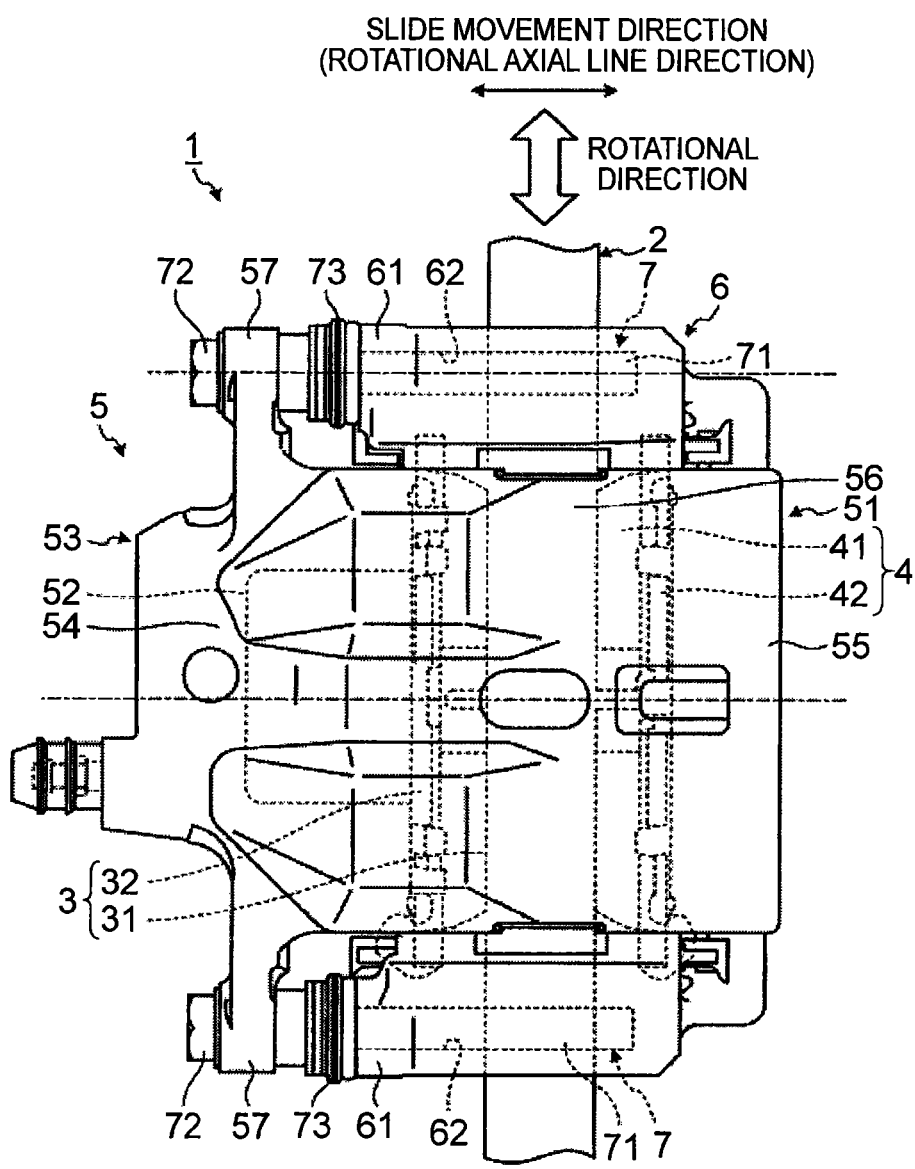
FIG. 1 is a schematic configuration diagram for illustrating a disc brake device in accordance with a first embodiment.
Figure 2:
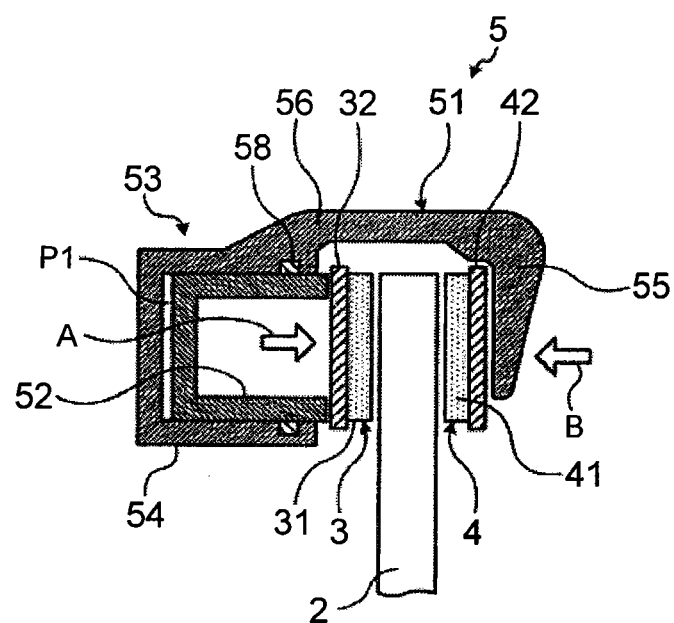
FIG. 2 is a cross-sectional view for illustrating the disc brake device in accordance with the first embodiment.
Figure 3:
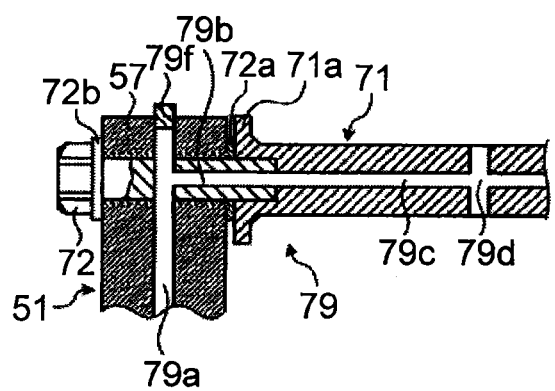
FIG. 3 is a cross-sectional view for illustrating a connecting section between a caliper and a slide pin in the disc brake in accordance with the first embodiment.
Figure 4:
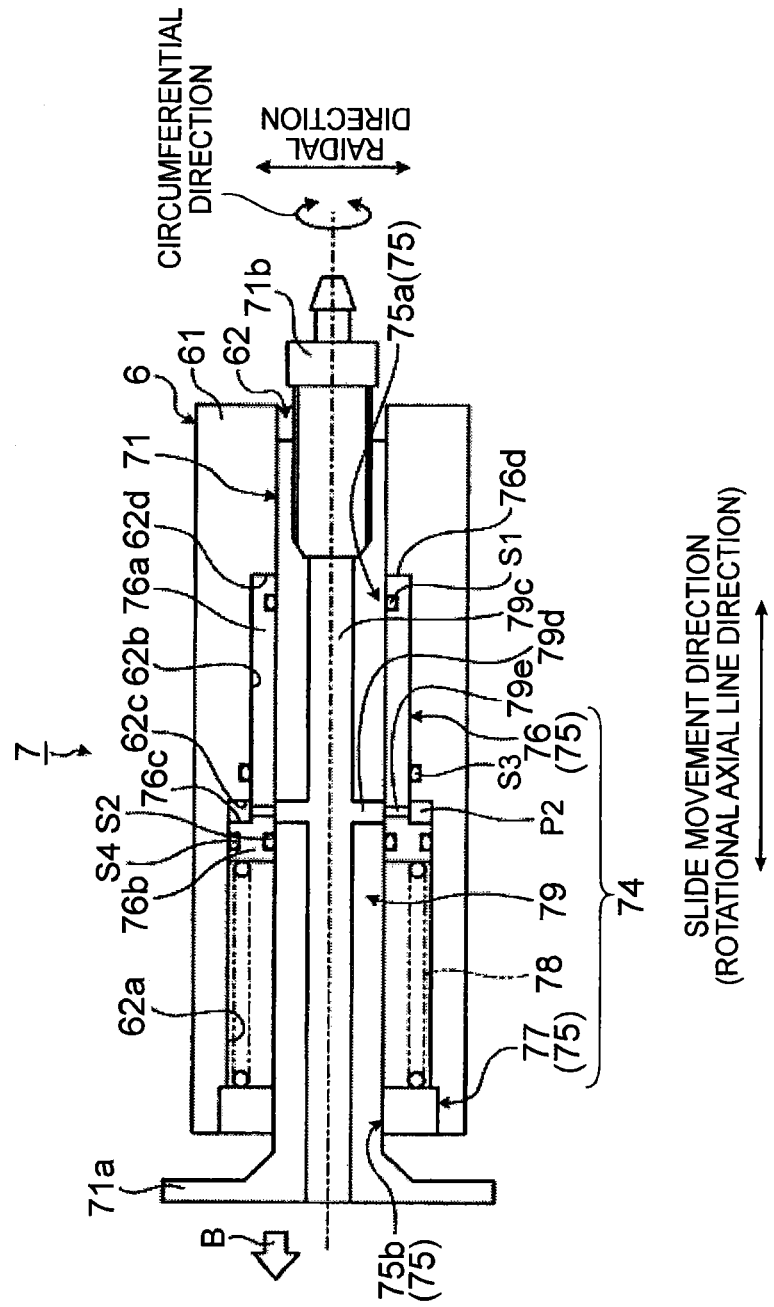
FIG. 4 is a cross-sectional view along a slide movement direction of a caliper slide mechanism in accordance with the first embodiment.
Figure 5:
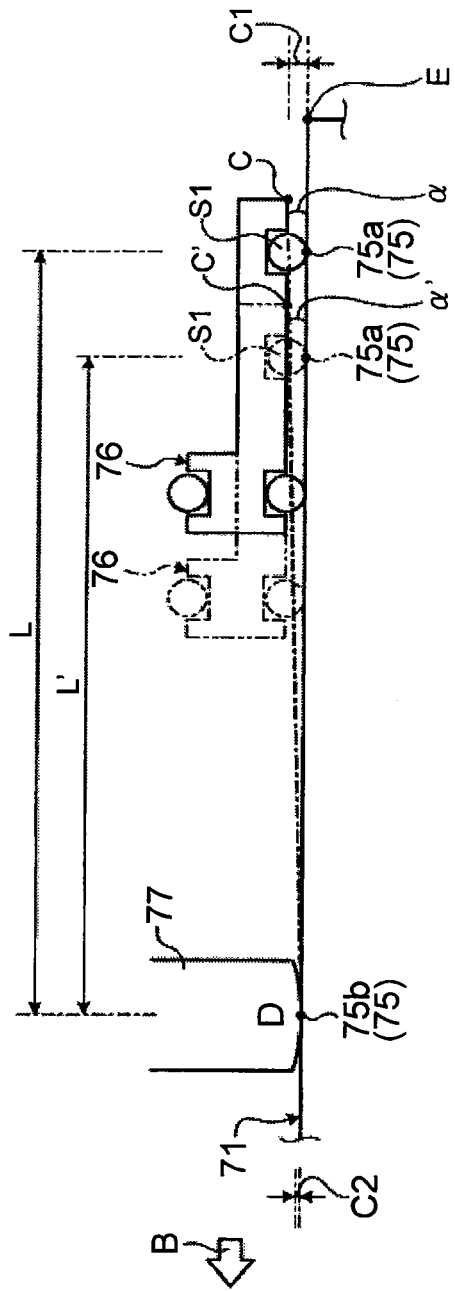
FIG. 5 is a partial cross-sectional view for explaining a permissible oscillation angle of the caliper slide mechanism in accordance with the first embodiment.

FIG. 1 is a schematic configuration diagram for illustrating a disc brake device in accordance with a first embodiment; FIG. 2 is a cross-sectional view for illustrating the disc brake device in accordance with the first embodiment; FIG. 3 is a cross-sectional view for illustrating a connecting section between a caliper and a slide pin in the disc brake in accordance with the first embodiment; FIG. 4 is a cross-sectional view along a slide movement direction of a caliper slide mechanism in accordance with the first embodiment; and FIG. 5 is a partial cross-sectional view for explaining a permissible swing angle of the caliper slide mechanism in accordance with the first embodiment.

A disc brake device 1 of this embodiment which is shown in FIGS. 1 and 2 is installed in a vehicle to provide braking force to wheels rotatably supported by a vehicle body of the vehicle. The disc brake device 1 generates braking force by pressing friction pads 3, 4 to a disc rotor 2 with a floating caliper 5 supported by a mounting 6. In the disc brake device 1 with a floating caliper, the caliper 5 is supported in a manner capable of slide movement in a rotational axial direction of the wheel with respect to the mounting 6.

Specifically, the disc brake device 1 includes a disc rotor 2, the pair of friction pads 3, 4, the caliper 5, the mounting 6, and a caliper slide mechanism 7.

The disc rotor 2 is formed in a general disk shape. The disc rotor 2 is provided on the wheel side so as to be integrally rotatable with the wheel around the rotational axial line of an axle.

The friction pads 3, 4 are friction members provided in a pair so as to respectively face friction surfaces of on both sides of the disc rotor 2.

The caliper 5 can press the friction pads 3, 4 to the friction surfaces of the disc rotor 2. The caliper 5 is configured to include a caliper body 51, a cylinder mechanism 53 having a piston 52, and the like. The caliper body 51 is formed in a U-shape extending across the disc rotor 2. The cylinder mechanism 53 is installed in the caliper body 51. The cylinder mechanism 53 is configured with an actuator that enables fore-aft movement of the piston 52.

More specifically, the caliper body 51 of the caliper 5 is configured to include a cylinder section 54, a reaction section 55, and a connecting section 56. The cylinder mechanism 53 is provided in the cylinder section 54. The reaction section 55 is arranged in a position where it faces the cylinder section 54 across the disc rotor 2. The connecting section 56 connects the cylinder section 54 and the reaction section 55. The caliper body 51 is integrally provided with a pair of arm sections 57 on both sides of the cylinder section 54, that is, in front and rear in a rotational direction of the disc rotor 2.

In the above-described pair of friction pads 3, 4, the friction pad 3 is arranged on the cylinder section 54 side of the caliper body 51 to form an inner pad, and the friction pad 4 is arranged on the reaction section 55 side to form an outer pad. The friction pads 3, 4 are configured such that base end sections of friction materials 31, 41 are fixed to back metals 32, 42. In the friction pad 3, front and rear end sections of the back metal 32 are supported by a pair of guide members formed in the mounting 6. In the caliper 5, a front surface of the piston 52 of the cylinder mechanism 53 put on the cylinder section 54 of the caliper body 51 contacts with a base end surface of the back metal 32 in the friction pad 3. Meanwhile, in the friction pad 4, the back metal 42 is fixed to or moveably supported by the reaction section 55 in the caliper 5.

Further, in the cylinder mechanism 53 of the caliper 5, the piston 52 is moveably supported by the cylinder section 54. The cylinder mechanism 53 is configured by putting a seal mechanism 58 that can seal against an outer surface of the piston 52 on an inner surface of the cylinder section 54. In the cylinder mechanism 53, a hydraulic pressure chamber (so-called wheel cylinder) P1 as a pressing pressure chamber is defined by the cylinder section 54, the piston 52, and the seal mechanism 58. In the cylinder mechanism 53, a distal end section of the piston 52 faces the back metal 32 of the friction pad 3. The hydraulic pressure chamber P1 is supplied with hydraulic oil as a hydraulic medium and generates force to press the friction pads 3, 4 to the friction surface of the disc rotor 2.

The mounting 6 is fixed to the vehicle side via a suspension, an intermediate beam, and the like. A pair of sleeves 61 are integrally provided on both sides of the mounting 6, in other words, in front and rear sections in the rotational direction of the disc rotor 2. In the mounting 6, a fitting hole 62 as a hole section in which one end opens and the other end is closed is formed in each of the sleeves 61. Each of the fitting holes 62 are formed to extend along the rotational axial line of the disc rotor 2.

The caliper slide mechanism 7 supports the caliper 5 on the mounting 6 in a manner enabling slide movement. The caliper slide mechanism 7 is provided in a pair in response to the pair of sleeves 61. The caliper slide mechanisms 7 are configured to include the respective fitting holes 62 described above and respective slide pins 71 corresponding to the fitting holes 62. In the caliper slide mechanisms 7, the slide pins 71 are inserted in the respective fitting holes 62. Accordingly, each of the caliper slide mechanisms 7 supports the caliper 5 on the mounting 6 via the slide pin 71 in a manner enabling slide movement. In the caliper slide mechanism 7, the rotational axial line direction of the disc rotor 2 corresponds to the slide movement direction of the caliper 5. The single slide pin 71 is provided to each of the arm sections 57 of the caliper body 51, that is, two slide pins 71 are provided in total. As shown in FIG. 3, a base end section 71a of the slide pin 71 is fixed to the corresponding arm section 57 via a fixing bolt. Distal end sections of the respective slide pins 71 are moveably fitted in the respective fitting holes 62 formed in the respective sleeve 61 of the mounting 6. Accordingly, in the caliper 5, the caliper body 51 is moveable with respect to the mounting 6 in the rotational axial line direction of the disc rotor 2, in other words, in a direction perpendicular to the rotational direction. In the caliper slide mechanisms 7, boots 73 are put between the respective arm sections 57 of the caliper body 51 and the respective sleeves 61 of the mounting 6. The boot 73 covers a fitting gap between an end section of the slide pin 71 and the fitting hole 62. Accordingly, each of the caliper slide mechanisms 7 can prevent entrance or the like of foreign objects into the fitting hole 62 by the boot 73. A configuration of the caliper slide mechanism 7 will be described below more in detail.

In the disc brake device 1 configured as described above, the hydraulic pressure chamber P1 of the cylinder mechanism 53 is supplied with hydraulic oil and pressurized according to brake control such as a pedaling operation on a brake pedal by a driver or so-called ABS control, for example. Then, in the disc brake device 1, the piston 52 advances in the direction of arrow A in FIG. 2, and a front surface of the piston 52 presses the back metal 32 of the friction pad (inner pad) 3. The disc brake device 1 allows the front surface of the friction pad 3 to approach the friction surface of the disc rotor 2. Further, at this point, by reaction force of the advancing movement of the piston 52, the caliper 5 allows the caliper body 51 to advance in the opposite direction to the piston 52, in other words, in the direction of arrow B in FIG. 2 and allows the pressing surface of the friction pad (outer pad) 4 to approach the friction surface of the disc rotor 2. Advancing directions A, B of the piston 52 and the caliper body 51 hereinafter mean the directions in which the piston 52 and the caliper body 51 move toward disc rotor 2 and press the respective friction pads 3, 4 to the disc rotor 2.

Then, in the disc brake device 1, the friction pads 3, 4 are pressed to the respective friction surfaces of the disc rotor 2 by the pressing force generated by the supply of the hydraulic oil to the hydraulic pressure chamber P1 and hold the disc rotor 2 therebetween. Accordingly, in the disc brake device 1, frictional resistance is generated between the friction pads 3, 4 and the disc rotor 2 rotating together with the wheel, and prescribed rotational resistance acts on the disc rotor 2. As a result, the disc brake device 1 applies braking force to the disc rotor 2 and the wheel rotating together with the disc rotor 2. Further, in the disc brake device 1, when the hydraulic chamber P1 is depressurized, the piston 52 and the caliper body 51 retreat and return to prescribed positions, and the friction pads 3, 4 separate from the disc rotor 2.

During this, in the disc brake device 1, the respective slide pins 71 of the caliper slide mechanisms 7 make slide movement along the rotational axial line direction of the disc rotor 2 in a state where the slide pins 71 are fitted in the respective fitting holes 62, and the caliper body 51 makes slide movement with respect to the mounting 6. Accordingly, the disc brake device 1 makes relative movement in the opposite direction while the caliper body 51 and the piston 52 are as described above guided by the caliper slide mechanisms 7.

Incidentally, as shown in FIG. 4, the caliper slide mechanism 7 has a swing variable mechanism 74 as a variable mechanism, and the disc brake device 1 of this embodiment is intended to thereby reduce noises. In other words, the swing variable mechanism 74 makes variable the permissible swing angle of the slide pin 71 with respect to the slide movement direction according to a braking action along with the slide movement of the caliper 5, and the caliper slide mechanism 7 thereby appropriately reduces various noises. The pair of caliper slide mechanisms 7 have substantially the same configurations. A description will be made about one of those, but a description for the other will be omitted in the following descriptions.

Specifically, the caliper slide mechanism 7 is configured to include the fitting hole 62, the slide pin 71, the fixing bolt 72, and the boot 73 as described above and to further include the swing variable mechanism 74 as shown in FIG. 4.

Here, the slide pin 71 is formed in a column shape and is inserted in a guide section 75 described below that is provided in the fitting hole 62. The slide pin 71 is capable of slide movement along a slide direction by being supported by the guide section 75 in the fitting hole 62. In other words, the slide movement of the slide pin 71 is guided by the guide section 75. The length of the slide pin 71 in the slide movement direction is set with wear allowances or the like of the friction pads 3, 4 taken into account, for example. The base end section 71a that is one end of the slide pin 71 is exposed from the fitting hole 62 in a state where the slide pin 71 is inserted in the guide section 75 of the fitting hole 62. The base end section 71a of the slide pin 71 is fixed to the arm section 57 by the fixing bolt 72 as described above, and the end section of the slide pin 71 is covered by the boot 73 (see FIGS. 1, 3, and so forth).

The swing variable mechanism 74 makes the permissible swing angle of the slide pin 71 with respect to the slide movement direction variable in response to the braking action along with the slide movement of the caliper 5. Here, the braking action along with the slide movement of the caliper 5 is typically an action in which the caliper 5 makes slide movement to press the friction pad 4 to the friction surface of the disc rotor 2 and an action in which the caliper 5 makes slide movement to separate the friction pad 4 from the disc rotor 2. Further, the permissible swing angle of the slide pin 71 with respect to the slide movement direction corresponds to an angle in which the slide pin 71 can relatively swing with respect to the mounting 6. The swing variable mechanism 74 in this embodiment makes the permissible swing angle in a braking state where the friction pad 4 is pressed to the friction surface of the disc rotor 2 larger than the permissible swing angle in a non-braking state where the friction pad 4 is separated from the friction surface of the disc rotor 2.

Specifically, the swing variable mechanism 74 is configured to include the guide section 75 as a structure for making the permissible swing angle variable. In the swing variable mechanism 74, the guide section 75 changes in response to the braking action, thereby changing the mode of guidance. Accordingly, the swing variable mechanism 74 makes the permissible swing angle variable.

The guide section 75 is provided in the fitting hole 62. The guide section 75 has two support parts 75a, 75b that support at least both end sections of the slide pin 71. In the guide section 75, the support part 75a supports an end section of the slide pin 71 on the distal end section side, and the support part 75b supports an end section of the slide pin 71 on the base end section 71a side, thereby guiding the slide movement of the slide pin 71.

The swing variable mechanism 74 of this embodiment changes a guide length (restraint length) of the slide pin 71 to make the permissible angle variable. Here, the guide length corresponds to an interval (distance) between the support parts 75a, 75b along the slide movement direction. The swing variable mechanism 74 makes the guide length in the braking state shorter than the guide length in the non-braking state. In other words, the swing variable mechanism 74 is a support point variable mechanism of the two support parts 75a, 75b or a guide length variable mechanism, thereby making the permissible swing angle variable.

More specifically, the swing variable mechanism 74 is configured to include a guide moving element 76 as a variable mechanism moving element, a fixing member 77, a spring 78, a communication path 79, and a hydraulic chamber P2 as a variable mechanism pressure chamber. Portions of the guide moving element 76 and the fixing member 77 constitute the above-described guide section 75.

The guide moving element 76 is provided with one of the two support parts 75a, 75b, here, the support part 75a. The fixing member 77 is provided with the other of the two support parts 75a, 75b, here, the support part 75b. The guide moving element 76 and the fixing member 77 are provided in the above-described fitting hole 62 provided in the sleeve 61.

Here, the fitting hole 62 is formed as a column-shaped space in the sleeve 61. In the caliper slide mechanism 7, typically, a direction along the central axial line of the fitting hole 62 serves as the slide movement direction of the slide pin 71 (caliper 5). A first housing groove 62a, a second housing groove 62b, and stepped sections 62c, 62d are formed in an inner peripheral surface of the fitting hole 62.

The first housing groove 62a is integral in the circumferential direction of the fitting hole 62 and is formed in a prescribed length along the slide movement direction. In other words, the first housing groove 62a is formed as a column-shaped space. The first housing groove 62a opens in the advancing direction (the direction of arrow B in FIG. 4) of the slide pin 71 (caliper 5), and the stepped section 62c is formed in the retreating direction. The second housing groove 62b is integral in the circumferential direction of the fitting hole 62 and is formed in a prescribed length along the slide movement direction. In other words, the second housing groove 62b is formed as a column-shaped space. In the second housing groove 62b, the above-described stepped section 62c is formed in the advancing direction of the slide pin 71, and the stepped section 62d is formed in the retreating direction. In other words, the first housing groove 62a, the stepped section 62c, the second housing groove 62b, and the stepped section 62d are integrally formed in an inner peripheral surface of the fitting hole 62. Further, in the fitting hole 62, the inner diameter of the second housing groove 62b is smaller than the inner diameter of the first housing groove 62a.

The guide moving element 76 is configured to include a main body section 76a and a pressure receiving section 76b. The main body section 76a is formed in a cylindrical shape. The pressure receiving section 76b is provided in one end section of the main body section 76a. The pressure receiving section 76b is formed in an annular shape (ring shape). In the guide moving element 76, the main body section 76a and the pressure receiving section 76b are integrally formed.

The guide moving element 76 is configured such that the inner diameter of the main body section 76a is equivalent to the inner diameter of the pressure receiving section 76b and the outer diameter of the pressure receiving section 76b is larger than the outer diameter of the main body section 76a. The inner diameters of the main body section 76a and the pressure receiving section 76b are slightly larger than the outer diameter of the slide pin 71. The outer diameter of the main body section 76a is slightly smaller than the inner diameter of the second housing groove 62b. The outer diameter of the pressure receiving section 76b is slightly smaller than the inner diameter of the first housing groove 62a.

The guide moving element 76 is inserted in the first housing groove 62a and the second housing groove 62b of the fitting hole 62. In the guide moving element 76, the pressure receiving section 76b is positioned in the advancing direction of the slide pin 71 (caliper 5) in the fitting hole 62, and the main body section 76a is positioned in the retreating direction.

More specifically, in the guide moving element 76, the main body section 76a is positioned in the second housing groove 62b, and the pressure receiving section 76b is positioned in the first housing groove 62a. Further, in the guide moving element 76, an outer peripheral surface of the main body section 76a faces an inner peripheral surface of the second housing groove 62b in the radial direction (typically, a direction perpendicular to the slide movement direction), and an outer peripheral surface of the pressure receiving section 76b faces an inner peripheral surface of the first housing groove 62a in the radial direction.

Further, in the guide moving element 76, a surface of the pressure receiving section 76b in the retreating direction faces the stepped section 62c in the slide movement direction and forms a pressure receiving surface 76c. In addition, in the guide moving element 76, a surface of the main body section 76a in the retreating direction faces the stepped section 62d in the slide movement direction and forms a contact surface 76d. The guide moving element 76 is provided in a manner capable of relative movement with respect to the sleeve 61 and is moveable along the slide movement direction in the fitting hole 62.

The fixing member 77 is formed in an annular shape (ring shape). The inner diameter of the fixing member 77 is slightly larger than the outer diameter of the slide pin 71. The fixing member 77 is inserted in the first housing groove 62a of the fitting hole 62.

More specifically, the fixing member 77 is fixed to an opening of the first housing groove 62a. An outer peripheral surface of the fixing member 77 faces inner peripheral surface of the first housing groove 62a. The guide moving element 76 is fixed to the sleeve 61 and is incapable of moving in the fitting hole 62 along the slide movement direction.

The spring 78 is arranged between the guide moving element 76 and the fixing member 77 in the slide movement direction. One end section of the spring 78 contacts with the fixing member 77, and the other end section contacts with the pressure receiving section 76b of the guide moving element 76, thereby urging the guide moving element 76 in the retreating direction. In other words, the guide moving element 76 is urged in the retreating direction of the slide pin 71 by elastic force of the spring 78. Accordingly, as described below, when the hydraulic pressure chamber P2 is not pressurized, in other words, in the non-braking state of the disc brake device 1, the spring 78 functions as a return spring for pushing back the guide moving element 76 that has moved in the advancing direction to a prescribed position. Typically, the spring 78 pushes back the guide moving element 76 to a position where the contact surface 76d contacts with the stepped section 62d as the prescribed position.

The distal end section side of the slide pin 71 is inserted in inner peripheral surface sides of the fixing member 77, the spring 78, and the pressure receiving section 76b and the main body section 76a of the guide moving element 76. An outer peripheral surface of the slide pin 71 faces the inner peripheral surfaces of the fixing member 77, the spring 78, and the main body section 76a and the pressure receiving section 76b of the guide moving element 76 in the radial direction.

Further, the swing variable mechanism 74 is provided with a plurality of seal members S1, S2, S3, S4. The plurality of seal members S1, S2, S3, S4 are provided between the inner peripheral surface of the guide moving element 76 and the outer peripheral surface of the slide pin 71 and between the outer peripheral surface of the guide moving element 76 and the inner peripheral surface of the fitting hole 62.

The seal member S1 is provided in a ring-shaped circumferential groove formed along the inner peripheral surface of the main body section 76a of the guide moving element 76. The seal member S1 is formed in a ring shape and provides a sealing function between the inner peripheral surface of the main body section 76a and the outer peripheral surface of the slide pin 71. The seal member S1 is provided in a vicinity of the contact surface 76d of the main body section 76a.

The seal member S2 is provided in a ring-shaped circumferential groove formed along the inner peripheral surface of the pressure receiving section 76b of the guide moving element 76. The seal member S2 is formed in a ring shape and provides a sealing function between the inner peripheral surface of the pressure receiving section 76b and the outer peripheral surface of the slide pin 71.

The seal member S3 is provided in a ring-shaped circumferential groove formed along the inner peripheral surface of the main body section 76a of the guide moving element 76. The seal member S3 is formed in a ring shape and provides a sealing function between the outer peripheral surface of the main body section 76a and the inner peripheral surface of the second housing groove 62b. The seal member S3 is provided in a vicinity of the pressure receiving section 76b of the main body section 76a.

The seal member S4 is provided in a ring-shaped circumferential groove formed along the outer peripheral surface of the pressure receiving section 76b of the guide moving element 76. The seal member S4 is formed in a ring shape and provides a sealing function between the outer peripheral surface of the pressure receiving section 76b and the inner peripheral surface of the first housing groove 62a.

The seal members S1, S2, S3, S4 are formed with so-called O-rings formed of an elastic material such as rubber, for example.

Further, in the swing variable mechanism 74, the hydraulic pressure chamber P2 is defined by the plurality of seal members S1, S2, S3, S4. The hydraulic pressure chamber P2 is formed of the outer peripheral surface of the main body section 76a, the pressure receiving surface 76c, the inner peripheral surface of the first housing groove 62a, the stepped section 62c, the seal members S1, S2, S3, S4, and the like. The hydraulic pressure chamber P2 is formed as a space in an annular shape (ring shape). When hydraulic oil is supplied into the hydraulic pressure chamber P2, the hydraulic pressure chamber P2 generates force that makes the guide moving element 76 in which the support part 75a is provided approach the support part 75b.

The seal member S1 is then pressed to the main body section 76a of the guide moving element 76 and the slide pin 71, thereby setting prescribed contact pressure therebetween. The seal member S2 is pressed to the pressure receiving section 76b of the guide moving element 76 and the slide pin 71, thereby setting prescribed contact pressure therebetween. The seal member S3 is pressed to the main body section 76a of the guide moving element 76 and the sleeve 61 (an inner wall surface of the second housing groove 62b), thereby setting prescribed contact pressure therebetween. The seal member S4 is pressed to the pressure receiving section 76b of the guide moving element 76 and the sleeve 61 (an inner wall surface of the first housing groove 62a), thereby setting prescribed contact pressure therebetween. Therefore, the hydraulic oil supplied to the hydraulic pressure chamber P2 is contained between the slide pin 71, the sleeve 61, and the guide moving element 76 and is thereby prevented from leaking outside.

The communication path 79 allows the hydraulic pressure chamber P1 and the hydraulic pressure chamber P2 to communicate with each other via the inside of the slide pin 71. As shown in FIGS. 3 and 4, the communication path 79 is configured to include a caliper path 79a, a bolt path 79b, a first pin path 79c, a second pin path 79d, a moving element path 79e, and the like. A base end section 71a of the slide pin 71 tightly fits to the arm section 57 of the caliper body 51 via a washer 72a. Further, the fixing bolt 72 passes through the arm section 57 via the washer 72b, and a distal end section of the fixing bolt 72 passes through the washer 72a and is screwed into the base end section 71a of the slide pin 71. The caliper path 79a is provided on the inside of the arm section 57 of the caliper body 51 to which the slide pin 71 is coupled as described above and communicates with the hydraulic pressure chamber P1 (see FIG. 2 and so forth). A fluid stopper 79f is fixed to an end section of the caliper path 79a. The bolt path 79b is provided on the inside of the fixing bolt 72 and communicates with the caliper path 79a. The first pin path 79c is provided on the inside of the slide pin 71 along the axial line, communicates with the bolt path 79b, and opens on a distal end surface of the slide pin 71. In the slide pin 71, a bleeder 71b for discharging air entering the communication path 79 is provided in a distal end section of the first pin path 79c. Accordingly, the disc brake device 1 can secure sufficient operability of the caliper body 51 and the piston 52 and can prevent shortage in braking force. The second pin path 79d is provided on the inside of the slide pin 71 along a direction intersecting with the axial line, communicates with the first pin path 79c, and opens on the outer peripheral surface of the slide pin 71. The moving element path 79e is provided to pass through the main body section 76a of the guide moving element 76, communicates with the second pin path 79d, and opens toward the hydraulic pressure chamber P2.

In other words, the communication path 79 allows the hydraulic pressure chamber P1 and the hydraulic pressure chamber P2 to communicate with each other via the caliper path 79a, the bolt path 79b, the first pin path 79c, the second pin path 79d, the moving element path 79e, and the like. As a result, the swing variable mechanism 74 can transmit the hydraulic pressure in the hydraulic pressure chamber P1 to the hydraulic pressure chamber P2 via the communication path 79. Accordingly, the swing variable mechanism 74 can change the hydraulic pressure in the hydraulic pressure chamber P2 in the same way as the hydraulic pressure of the hydraulic pressure chamber P1 according to the change in the hydraulic pressure in the hydraulic pressure chamber P1 in response to the braking action.

Accordingly, hydraulic oil is supplied from the hydraulic pressure chamber P1 to the hydraulic pressure chamber P2 via the communication path 79 when the hydraulic pressure chamber P1 is pressurized, in other words, in the braking state of the disc brake device 1. In addition, for example, hydraulic oil is supplied from the hydraulic pressure chamber P1 to the hydraulic pressure chamber P2 via the communication path 79 during an increase of master cylinder pressure as the braking state of the disc brake device 1. Here, the master cylinder pressure is pressure that is applied to hydraulic oil (brake oil) according to the operation amount of a braking operation (for example, a pedaling operation on the brake pedal) by the driver. A time in which the master cylinder pressure is increased is typically a time in which a brake operation is made by the driver. Accordingly, the hydraulic pressure equivalent to that of the hydraulic pressure chamber P1 is applied to the hydraulic pressure chamber P2, and the hydraulic pressure chamber P2 thereby can generate the force that makes the guide moving element 76 in which the support part 75a is provided approach the support part 75b and apply the generated force to the pressure receiving surface 76c of the guide moving element 76.

As a result, the hydraulic pressure in the hydraulic pressure chamber P2 changes according to the change in the hydraulic pressure in the hydraulic pressure chamber P1 in response to the braking action along with the slide movement of the caliper 5, and the swing variable mechanism 74 can thereby move the guide moving element 76 along the slide movement direction in response to the braking action. Accordingly, the swing variable mechanism 74 can make variable the guide length that is the interval (distance) between the two support parts 75a, 75b along the slide movement direction.

In the swing variable mechanism 74, the guide moving element 76 advances in the direction of arrow B along with the slide pin 71 by the pressing force generated by the supply of hydraulic oil into the hydraulic pressure chamber P2 during braking of the disc brake device 1, in other words, when the hydraulic pressure chambers P1, P2 are pressurized. In the swing variable mechanism 74, the guide moving element 76 then approaches the support part 75b of the fixing member 77 of the guide moving element 76 and compresses the spring 78. Accordingly, the swing variable mechanism 74 can relatively reduce the guide length (interval) between the support part 75a and the support part 75b in the slide movement direction by the hydraulic pressure supplied into the hydraulic pressure chamber P2 along with a pressurizing action of the hydraulic chamber P1 during the braking of the disc brake device 1.

Meanwhile, in the swing variable mechanism 74, when the disc brake device 1 is not operating, in other words, when the hydraulic pressure chambers P1, P2 are not pressurized, the guide moving element 76 along with the slide pin 71 retreats and separates from the support part 75b of the fixing member 77 by the urging force of the spring 78. The swing variable mechanism 74 is pushed back to the position where the contact surface 76d of the guide moving element 76 contacts with the stepped section 62d. Accordingly, the swing variable mechanism 74 can relatively increase the guide length (interval) between the support part 75a and the support part 75b along the slide movement direction by depressurization of the hydraulic pressure chamber P2 along with a depressurizing action of the hydraulic chamber P1 during the non-braking of the disc brake device 1.

Further, the support part 75a is constituted with the seal member S1 provided in the guide moving element 76 in the guide section 75 of the swing variable mechanism 74. Moreover, the support part 75b is configured with the inner peripheral surface of the fixing member 77 in the guide section 75. Accordingly, in the guide section 75, the support part 75a serves as a moving support section that is moveable in the slide direction along with the guide moving element 76, and the support part 75b serves as a fixed support section.

In other words, in the swing variable mechanism 74, the one support part 75a provided in the guide moving element 76 elastically supports (in other words, elastically restrains) the slide pin 71 by the seal member S1. Further, as shown in FIG. 5, in the swing variable mechanism 74, a clearance C1 between the guide moving element 76 and the slide pin 71 is larger than a clearance C2 between the support part 75b and the slide pin 71. Here, the clearance C1 corresponds to a total clearance between the outer peripheral surface of the slide pin 71 and the inner peripheral surface of the guide moving element 76. The clearance C2 corresponds to a total clearance between the outer peripheral surface of the slide pin 71 and the inner peripheral surface of the fixing member 77 and is set as small as possible in a range that permits the slide movement of the slide pin 71.

Accordingly, the seal member S1 constituting the support part 75a elastically deforms in the clearance C1, and the swing variable mechanism 74 can permit the slide pin 71 to swing with respect to the slide movement direction with the support part 75b as a reference. In this case, the permissible swing angle of the slide pin 71 with respect to the slide movement direction is determined according to the clearance C1 and the guide length (the interval between the support part 75a and the support part 75b along the slide movement direction).

As a result, the swing variable mechanism 74 makes the guide length of the guide section 75 variable in response to the braking action along with the slide movement of the caliper 5 as described above, thereby making the permissible swing angle of the slide pin 71 variable.

As indicated by a solid line, the swing variable mechanism 74 can relatively increase a guide length L between the support part 75a and the support part 75b along the slide movement direction in the non-braking of the disc brake device 1, in other words, when the hydraulic pressure chamber P2, P1 are not pressurized. Accordingly, the swing variable mechanism 74 can relatively reduce the permissible swing angle α. Here, the permissible swing angle α corresponds to the angle formed by a point C, a point D, and a point E in the support part 75b. The point C is positioned by in end section of the inner peripheral surface of the guide moving element 76 in the retreating direction in a cross section along the slide movement direction. The point D is a support point positioned by the support part 75b in a cross section along the slide movement direction. The point E is a point on the outer peripheral surface of the slide pin 71 in a cross section along the slide movement direction.

Meanwhile, as indicated by a two-dot difference line, the swing variable mechanism 74 can relatively reduce a guide length L' between the support part 75a and the support part 75b along the slide movement direction in the braking of the disc brake device 1, in other words, when the hydraulic pressure chamber P1, P2 are pressurized. Accordingly, the swing variable mechanism 74 can relatively increase the permissible swing angle α'. Here, the permissible swing angle α' corresponds to the angle formed by a point C', the point D, and the point E in the support part 75b. The point C' is positioned by the end section of the inner peripheral surface of the guide moving element 76 in the retreating direction in a cross section along the slide movement direction. The point D is the support point positioned by the support part 75b in a cross section along the slide movement direction. The point E is the point on the outer peripheral surface of the slide pin 71 in a cross section along the slide movement direction.

As a result, the swing variable mechanism 74 can make the guide length L' in the braking state shorter than the guide length L in the non-braking state and thereby makes the permissible swing angle α' in the braking state larger than the permissible swing angle α in the non-braking state.

In the disc brake device 1 configured as described above, the hydraulic chamber P1 is supplied with hydraulic oil and pressurized according to brake control such as a pedaling operation on the brake pedal by the driver or so-called ABS control, for example. Then, the caliper body 51 and the piston 52 press the friction pads 3, 4 to the respective friction surfaces of the disc rotor 2 by the pressing force generated by the supply of hydraulic oil to the hydraulic chamber P1, and the disc brake device 1 thereby generates braking force. Along with this, the hydraulic pressure chamber P2 is supplied with hydraulic oil and pressurized in the disc brake device 1. Accordingly, the guide moving element 76 along with the slide pin 71 makes slide movement to approach the support part 75b of the fixing member 77 by the pressing force generated by the supply of the hydraulic oil to the hydraulic chamber P2, and the disc brake device 1 thereby compresses the spring 78. Therefore, in the disc brake device 1, the guide length between the support part 75a and the support part 75b along the slide movement direction is relatively reduced in the braking state, and the permissible swing angle of the slide pin 71 is relatively increased.

Further, in the disc brake device 1, hydraulic oil is discharged from the hydraulic chambers P1, P2 and they are depressurized according to brake control such as release of the brake pedal from a pedaling operation by the driver or so-called ABS control, for example. In the disc brake device 1, the guide moving element 76 along with the slide pin 71 then makes slide movement to separate from the support part 75b of the fixing member 77 by the urging force of the spring 78 and is pushed back to the position where the contact surface 76d contacts with the stepped section 62d. Accordingly, in the disc brake device 1, the guide length between the support part 75a and the support part 75b along the slide movement direction is relatively increased in the non-braking state, and the permissible swing angle of the slide pin 71 is relatively reduced.

As a result, in the disc brake device 1, the swing variable mechanism 74 of the caliper slide mechanism 7 makes the permissible swing angle of the slide pin 71 variable in response to the braking action along with the slide movement of the caliper 5 and makes the permissible swing angle in the braking state larger than the permissible angle in the non-braking state. Accordingly, the disc brake device 1 can at the same time realize reduction of so-called rattle noise and reduction of so-called moan noise and can thus appropriately reduce noises.

Here, rattle noise is a knocking sound produced during vehicle travel. The rattle noise may be produced because the caliper 5 moves due to vertical gravity or the like input from a road surface, for example, when the vehicle travels on a rough road surface in a state where the disc brake device 1 does not generate braking force and the slide pin 71 collides with an inner wall surface of the fitting hole 62 along with the movement of the caliper 5.

However, in the caliper slide mechanism 7 of this embodiment, the swing variable mechanism 74 relatively increases the guide length of the guide section 75 along the slide movement direction in the non-braking state and relatively reduces the permissible swing angle of the slide pin 71, and the slide pin 71 can securely be restrained in the fitting hole 62. Accordingly, the caliper slide mechanism 7 can reduce a collision speed at a time when the slide pin 71 collides in the fitting hole 62 and reduce collision energy and can thus reduce the rattle noise.

Further, in this case, the caliper slide mechanism 7 can securely restrain the slide pin 71 in the fitting hole 62 and can thus sufficiently secure stability of the caliper 5 with respect to the disc rotor 2. Accordingly, the caliper slide mechanism 7 can securely hold the caliper 5 in an appropriate position in the non-braking state and can thus securely reduce drag or the like of the friction pads 3, 4.

Meanwhile, the moan noise is a self-excited vibration sound (creaking sound) at about several hundred Hz produced during braking of the vehicle. The moan noise may be produced because an intermediate beam, a suspension, and the like form a coupled vibration system (vibration transmission system) via the caliper 5, the slide pin 71, the mounting 6, and the like with a connecting part between the friction pads 3, 4 and the disc rotor 2 being a vibration source, for example, in a state where the disc brake device 1 is generating braking force and a self-excited vibration thereby occurs. The coupled vibration system of the disc brake device 1, the suspension, and the like may be formed because when the friction pads 3, 4 contact with the disc rotor 2 to generate braking force, the slide pin 71 is forcedly twisted in the fitting hole 62 along with the contact.

The moan noise can be reduced by hindering twist of the slide pin 71 in the fitting hole 62 by increasing a clearance around the slide pin 71, for example. However, this is incompatible with securely restraining the slide pin 71 in the fitting hole 62 for dealing with the rattle noise as described above and may not be realized at the same time with reduction of the rattle noise.

That is, when the clearance around the slide pin 71 is simply reduced, rattle noise reduction performance can be improved; however, moan noise reduction performance is tend to decrease. On the other hand, when the clearance around the slide pin 71 is simply increased, the moan noise reduction performance can be improved; however, the rattle noise reduction performance tends to decrease. As a result, the rattle noise reduction and the moan noise reduction may not be realized at the same time.

Further, even if the moan noise is dealt with by providing a mass damper or the like to offset the resonance point, the frequency of the moan noise only changes, but it does not become a basic solution.

However, in the caliper slide mechanism 7 of this embodiment, the swing variable mechanism 74 relatively reduces the guide length between the support part 75a and the support part 75b along the slide movement direction in the braking state, and the permissible swing angle of the slide pin 71 with respect to the slide movement direction is relatively increased. Accordingly, the caliper slide mechanism 7 can further permit the swing of the slide pin 71 along with swing of the caliper 5 in the radial direction and swing with respect to the slide movement during braking of the vehicle. Accordingly, the caliper slide mechanism 7 can hinder the formation of the above-described coupled vibration system with the disc brake device 1, the suspension, and the like during braking of the vehicle, and the moan noise can thus be reduced.

Therefore, the caliper slide mechanism 7 can at the same time realize reduction of the rattle noise and reduction of the moan noise with a mechanical configuration and can thus appropriately reduce noises.

Further, for example, the caliper slide mechanism 7 can also reduce the rattle noise and the moan noise by interposing an absorption member between the slide pin 71 and the fitting hole 62. However, in this case, a slide resistance increases during slide movement of the slide pin 71. This results in drag of the friction pads 3, 4 and may result in so-called brake vibration.

However, in the caliper slide mechanism 7, the swing variable mechanism 74 makes the permissible swing angle of the slide pin 71 variable, thereby realizing reduction of the rattle noise and reduction of the moan noise at the same time. Accordingly, the caliper slide mechanism 7 can hinder the above-described drag during slide movement of the slide pin 71 and the brake vibration and can also realize reduction of the rattle noise and reduction of the moan noise at the same time.

Further, in the caliper slide mechanism 7 of this embodiment, because the swing variable mechanism 74 permits swing of the slide pin 71 in the braking state, even if high precision in the mounting of the caliper 5, high precision in the flatness of the friction pads 3, 4, and the like are not secured, braking force can appropriately be applied to the wheel, thereby allowing reduction in manufacturing cost, for example.

The disc brake device 1 in accordance with the embodiment described above includes: the disc rotor 2 that rotates around the rotational axial line; the friction pad 4 that faces the friction surface of the disc rotor 2; the caliper 5 that is capable of pressing the friction pad 4 to the friction surface of the disc rotor 2; the mounting 6 in which the caliper 5 is provided; the caliper slide mechanism 7 that supports the caliper 5 in a manner enabling slide movement on the mounting 6 via the slide pin 71 inserted in the guide section 75 provided in the fitting hole 62 in the mounting 6. The caliper slide mechanism 7 has the swing variable mechanism 74 that makes the permissible swing angle of the slide pin 71 with respect to the slide movement direction variable in response to the braking action along with the slide movement of the caliper 5. Here, the guide section 75 has the two support parts 75a, 75b that support at least both the end sections of the slide pin 71 to guide the slide movement of the slide pin 71. Further, the caliper slide mechanism 7 makes the guide length between the two support parts 75a, 75b of the guide section 75 along the slide movement direction in response to the braking action along with slide movement of the caliper 5.

Accordingly, the disc brake device 1 and the caliper slide mechanism 7 makes the guide length variable, makes the permissible swing angle variable, and thus makes a restraining condition of the slide pin 71 variable, can thereby realize reduction of the rattle noise and reduction of the moan noise at the same time, and can thus appropriately reduce noises. The disc brake device 1 and the caliper slide mechanism 7 can appropriately reduce so-called NV (Noise-Vibration).

[Second Embodiment]

Figure 6:
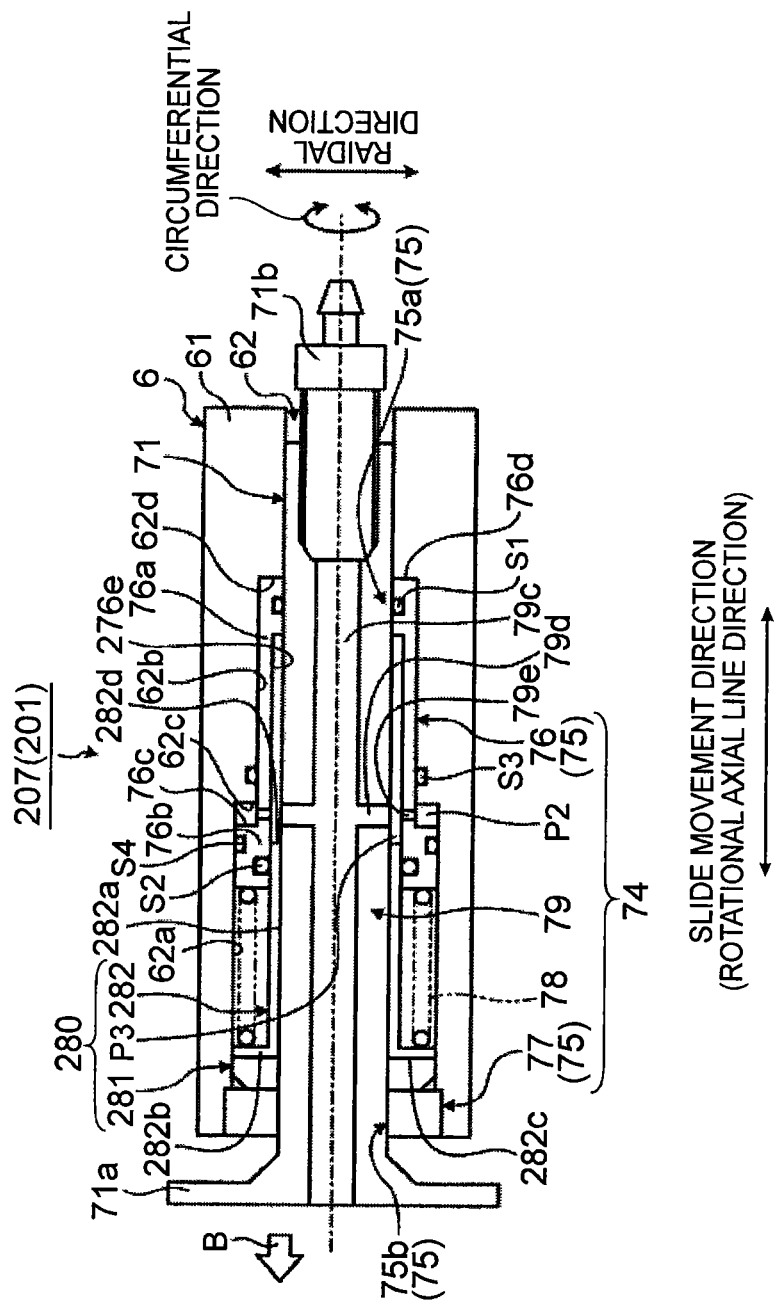
FIG. 6 is a cross-sectional view along a slide movement direction of a caliper slide mechanism in accordance with a second embodiment.

FIG. 6 is a cross-sectional view along a slide movement direction of a caliper slide mechanism in accordance with a second embodiment. A disc brake device and the caliper slide mechanism in accordance with the second embodiment differ from the first embodiment in including a positioning mechanism. Duplicating descriptions of other configurations, operations, and effects in common with the above-described embodiment will be omitted as much as possible (likewise in embodiments described below).

A caliper slide mechanism 207 of a disc brake device 201 of this embodiment is configured to include the fitting hole 62, the slide pin 71, the fixing bolt 72 (see FIG. 1 and so forth), and the boot 73 (see FIG. 1 and so forth) as described above and to further include a positioning mechanism 280 as shown in FIG. 6.

The positioning mechanism 280 is capable of changing relative positions of the sleeve 61 of the mounting 6 in which the fitting hole 62 is provided and the slide pin 71. Accordingly, the positioning mechanism 280 can securely hold the caliper 5 in an appropriate position in the non-braking state and thus functions as a drag reduction mechanism that securely reduce drag or the like of the friction pads 3, 4.

Specifically, the positioning mechanism 280 is configured to include an elastic member 281, a positioner moving element 282 as a positioning mechanism moving element, and a hydraulic pressure chamber P3 as a positioning mechanism pressure chamber.

The elastic member 281 is interposed between the slide pin 71 and the sleeve 61 and is capable of compressive deformation in the braking state. The elastic member 281 is provided in the fitting hole 62 provided in the sleeve 61. More specifically, the elastic member 281 is inserted in the first housing groove 62a of the fitting hole 62. The elastic member 281 is arranged between the fixing member 77 and the positioner moving element 282 described below in the slide movement direction. The elastic member 281 is formed in an annular shape (ring shape). The elastic member 281 is a member that elastically deforms such as a rubber member and functions as a retracting mechanism that retracts the caliper 5 when the hydraulic pressure chambers P1, P2, P3 are depressurized as described below. The inner diameter of the elastic member 281 is slightly larger than the outer diameter of the slide pin 71. The outer diameter of the elastic member 281 is slightly smaller than the inner diameter of the first housing groove 62*a*.

The positioner moving element 282 is interposed between the slide pin 71 and the sleeve 61, is moveable along the slide movement direction following the deformation of the elastic member 281, and determines a maximum compressive deformation of the elastic member 281. The positioner moving element 282 is provided in the fitting hole 62 provided in the sleeve 61.

Specifically, the positioner moving element 282 is configured to include a main body section 282*a* and a pressing section 282*b*. The main body section 282*a* is formed in a cylindrical shape. The pressing section 282*b* is provided in one end section of the main body section 282*a*. The pressing section 282*b* is formed in an annular shape (ring shape). In the positioner moving element 282, the main body section 282*a* and the pressing section 282*b* are integrally formed.

The positioner moving element 282 is configured such that the inner diameter of the main body section 282*a* is equivalent to the inner diameter of the pressing section 282*b* and the outer diameter of the pressing section 282*b* is larger than the outer diameter of the main body section 282*a*. The inner diameters of the main body section 282*a* and the pressing section 282*b* are slightly larger than the outer diameter of the slide pin 71. The outer diameter of the main body section 282*a* is slightly smaller than the inner diameter of a housing groove 276*e* described below. The outer diameter of the pressing section 282*b* is slightly smaller than the inner diameter of the first housing groove 62*a*.

Here, in the guide moving element 76 of the swing variable mechanism 74 of this embodiment, the housing groove 276*e* is formed in the inner peripheral surfaces of the main body section 76*a* and the pressure receiving section 76*b*. The housing groove 276*e* is integral in the circumferential direction of the inner peripheral surfaces of the main body section 76*a* and the pressure receiving section 76*b* and is formed in a prescribed length along the slide movement direction. In other words, the housing groove 276*e* is formed as a column-shaped space. The housing groove 276*e* opens in the advancing direction (the direction of arrow B in FIG. 6) of the slide pin 71 (caliper 5), and an end section of the housing groove 276*e* in the retreating direction is closed in a vicinity of the seal member S1. The inner diameter of the housing groove 276*e* is slightly larger than the outer diameter of the main body section 282*a* of the positioner moving element 282.

The above-described positioner moving element 282 is inserted in the first housing groove 62*a* of the fitting hole 62. In addition, the positioner moving element 282 is inserted on the inside of the spring 78. In the positioner moving element 282, the pressing section 282*b* is positioned in the advancing direction of the slide pin 71 (caliper 5) in the fitting hole 62, and the main body section 282*a* is positioned in the retreating direction. Further, in the positioner moving element 282, an end section of the main body section 282*a* in the retreating section is inserted in the housing groove 276*e* of the guide moving element 76. In the positioner moving element 282, the outer peripheral surface of the main body section 282*a* faces an inner peripheral surface of the housing groove 276*e* in the radial direction, and an outer peripheral surface of the pressing section 282*b* faces the inner peripheral surface of the first housing groove 62*a* in the radial direction.

Further, in the positioner moving element 282, an end surface of the pressing section 282*b* in the advancing direction in the slide movement direction faces the elastic member 281 in the slide movement direction and forms a pressing surface 282*c*. In other words, the elastic member 281 is interposed between the pressing surface 282*c* and the fixing member 77 in the slide movement direction. The elastic member 281 sets prescribed contact pressure between the slide pin 71 and the first housing groove 62*a* (sleeve 61) in a state where the elastic member 281 is supported between the pressing surface 282*c* and the fixing member 77. In the positioner moving element 282, an end surface of the main body section 282*a* in the retreating direction faces the hydraulic pressure chamber P3 described below in the slide movement direction and forms a pressure receiving surface 282*d*. The positioner moving element 282 is provided in a manner capable of relative movement with respect to the sleeve 61 and is moveable along the slide movement direction in the fitting hole 62.

The distal end side of the slide pin 71 is inserted in inner peripheral surface sides of the fixing member 77, the pressing section 282*b* and the main body section 282*a* of the positioner moving element 282, and the pressure receiving section 76*b* and the main body section 76*a* of the guide moving element 76. The outer peripheral surface of the slide pin 71 faces the inner peripheral surfaces of the fixing member 77, the main body section 282*a* and the pressing section 282*b* of the positioner moving element 282, and the main body section 76*a* and the pressure receiving section 76*b* of the guide moving element 76 in the radial direction.

Further, the spring 78 of this embodiment is arranged between the guide moving element 76 and the positioner moving element 282 in the slide movement direction. The one end section of the spring 78 contacts with the pressing section 282*b* of the positioner moving element 282, and the other end section contacts with the pressure receiving section 76*b* of the guide moving element 76, thereby urging the guide moving element 76 in the retreating direction. The reaction force by the urging force of the spring 78 (spring set load) acts on the positioner moving element 282 and the elastic member 281 via the pressing surface 282*c*. Further, the seal member S2 of this embodiment provides a sealing function between the inner peripheral surface of the pressure receiving section 76*b* and the outer peripheral surface of the main body section 282*a*. The seal member S2 is pressed to the pressure receiving section 76*b* and the main body section 282*a*, thereby setting prescribed contact pressure therebetween.

Further, in the swing variable mechanism 74 and the positioning mechanism 280, the hydraulic pressure chambers P2, P3 are defined by the seal members S1, S2, S3, S4. The hydraulic pressure chamber P2 of this embodiment is formed with the outer peripheral surface of the main body section 76*a*, the pressure receiving surface 76*c*, the inner peripheral surface of the first housing groove 62*a*, the stepped section 62*c*, the seal members S3, S4, and the like. Meanwhile, the hydraulic pressure chamber P3 is formed with the inner peripheral surface of the main body section 76*a* and the pressure receiving section 76*b* (in other words, the inner peripheral surface of the housing groove 276*e*), the pressure receiving surface 282*d* of the main body section 282*a*, the outer peripheral surface of the slide pin 71, the seal members S1, S2, and the like. The hydraulic pressure chamber P2 is formed as a space in an annular shape (ring shape) outside of the main body section 76*a* in the radial direction. When hydraulic oil is supplied into the hydraulic pressure chamber P2, the hydraulic pressure chamber P2 generates force that makes the guide moving element 76 in which the support part 75a is provided approach the support part 75b. Meanwhile, the hydraulic pressure chamber P3 is formed as a space in a cylindrical shape inside of the main body section 76a in the radial direction. When hydraulic oil is supplied into the hydraulic pressure chamber P3, the hydraulic pressure chamber P3 generates force that makes the positioner moving element 28 move along the slide movement direction.

In the communication path 79 of this embodiment, the second pin path 79d opens toward the hydraulic pressure chamber P3. Further, in the communication path 79, the moving element path 79e is provided to pass through the main body section 76a and allows the hydraulic pressure chamber P2 and the hydraulic pressure chamber P3 to communicate with each other. In other words, the communication path 79 allows the hydraulic pressure chamber P1 and the hydraulic pressure chamber P3 to communicate with each other via the caliper path 79a, the bolt path 79b, the first pin path 79c, the second pin path 79d, and the like and allows the hydraulic pressure chamber P3 and the hydraulic pressure chamber P2 to communication with each other via the moving element path 79e. As a result, the swing variable mechanism 74 can transmit the hydraulic pressure in the hydraulic pressure chamber P1 to the hydraulic pressure chamber P3 and the hydraulic pressure chamber P2 via the communication path 79. Accordingly, the swing variable mechanism 74 and the positioning mechanism 280 can change the hydraulic pressure in the hydraulic pressure chamber P2 and the hydraulic pressure chamber P3 in the same way as the hydraulic pressure of the hydraulic pressure chamber P1 according to the change in the hydraulic pressure in the hydraulic pressure chamber P1 in response to the braking action.

Accordingly, hydraulic oil is supplied from the hydraulic pressure chamber P1 to the hydraulic pressure chambers P2, P3 via the communication path 79 when the hydraulic pressure chamber P1 is pressurized, in other words, in the braking state of the disc brake device 201. In addition, for example, hydraulic oil is supplied from the hydraulic pressure chamber P1 to the hydraulic pressure chambers P2, P3 via the communication path 79 during an increase of master cylinder pressure as the braking state of the disc brake device 201. Accordingly, the hydraulic pressure equivalent to that of the hydraulic pressure chamber P1 is applied to the hydraulic pressure chamber P2, and the pressure chamber P2 thereby can generate the force that makes the guide moving element 76 in which the support part 75a is provided approach the support part 75b and apply the generated force to the pressure receiving surface 76c of the guide moving element 76. In the same way, the hydraulic pressure equivalent to that of the hydraulic pressure chamber P1 is applied to the hydraulic pressure chamber P3, and the pressure chamber P3 thereby can generate the force that makes the positioner moving element 282 move along the slide movement direction and apply the generated force to the pressure receiving surface 282d. As a result, the hydraulic pressure in the hydraulic pressure chamber P3 changes according to the change in the hydraulic pressure in the hydraulic pressure chamber P1 in response to the braking action along with the slide movement of the caliper 5, and the positioning mechanism 280 can thereby makes the positioner moving element 282 approach the fixing member 77 in response to the braking action to press the elastic member 281.

Further, when the compressive deformation reaches a preset prescribed value, the positioning mechanism 280 permits relative movement between the slide pin 71 and the positioner moving element 282 or between the sleeve 61 and the positioner moving element 282, thereby changing the relative positions of the slide pin 71 and the sleeve 61. The positioning mechanism 280 determines maximum retraction of the caliper 5 by the elastic member 281, the positioner moving element 282, and the like. When the relative movement between the slide pin 71 and the sleeve 61 exceeds the maximum retraction, the positioning mechanism 280 of this embodiment changes the relative positions of the slide pin 71 and the sleeve 61.

In the disc brake device 201 configured as described above, the hydraulic chamber P1 is supplied with hydraulic oil and pressurized according to brake control such as a pedaling operation on the brake pedal by the driver or so-called ABS control, for example. Accordingly, the caliper body 51 and the piston 52 press the friction pads 3, 4 to the respective friction surfaces of the disc rotor 2 by the pressing force generated by the supply of the hydraulic oil to the hydraulic chamber P1, and the disc brake device 1 thereby generates braking force. Here, in the disc brake device 201, the starting load of the caliper body 51 is preferably set to be larger than the starting load of the piston 52. In this case, the starting load of the caliper body 51 corresponds to the load corresponding to the frictional load of the seal members and the compression load of the elastic member 281. The starting load of the piston 52 corresponds to the load corresponding to the frictional load of the seal mechanism 58. In this case, in the disc brake device 201, when the hydraulic pressure chamber P1 is supplied with hydraulic oil and pressurized, the piston 52 first advances and the caliper body 51 next advances.

Further, in the disc brake device 201, the hydraulic pressure chambers P2, P3 are supplied with hydraulic oil at equivalent hydraulic pressure and pressurized along with the supply of hydraulic oil to the hydraulic pressure chamber P1. Then, in the disc brake device 201, the force generated by the supply of hydraulic oil to the hydraulic pressure chambers P1, P2, P3 makes the slide pin 71, the guide moving element 76, and the positioner moving element 282 advance. Accordingly, in the positioning mechanism 280, when the hydraulic pressure chamber P3 is pressurized, the positioner moving element 282 makes slide movement to approach the fixing member 77 and compresses the elastic member 281. In this case, the elastic restoration of the elastic member 281 constituting the retracting mechanism is determined as maximum retraction of the caliper body 51. In other words, in the positioning mechanism 280, the compressive deformation of the elastic member 281 by the positioner moving element 282 corresponds to retraction of the slide pin 71, further of the caliper body 51.

In the positioning mechanism 280, when the hydraulic pressure chambers P1, P2, P3, and the like are continuously pressurized, the positioner moving element 282 further advances along with the slide pin 71 and the guide moving element 76, compresses and deforms the elastic member 281 to a prescribed extent (typically maximum deformation), and then stops.

Further, in the disc brake device 201, hydraulic oil is discharged from the hydraulic chambers P1, P2, P3 and they are depressurized according to brake control such as release of the brake pedal from a pedaling operation by the driver or so-called ABS control, for example. Accordingly, in the disc brake device 201, the slide pin 71 and the positioner moving element 282 together retreat by restoration force of the elastic member 281 that is compressed and deformed. In this case, in the positioning mechanism 280, the slide pin 71 and the positioner moving element 282 make no relative movement due to various contact pressure and the like. Therefore, the slide pin 71 (caliper body 51) is returned to an original appropriate position in the non-braking state, the disc rotor 2 is released from pressing by the friction pads 3, 4.

Further, in the disc brake device 201, when the friction pad 4 wears, the slide pin 71 advances more than necessary and makes relative movement from the positioner moving element 282. In other words, in the positioning mechanism 280, when the hydraulic pressure chamber P3 is supplied with hydraulic oil and pressurized, in the same way as above, the slide pin 71 and the positioner moving element 282 advance. Further, in the positioning mechanism 280, the positioner moving element 282 and the slide pin 71 together advance, compress and deform the elastic member 281 to the maximum compressive deformation, and then stop. In the positioning mechanism 280, when the slide pin 71 advances more than the maximum compressive deformation of the elastic member 281, the slide pin 71 is permitted to further advance with respect to the positioner moving element 282 that has stopped. The slide pin 71 advances more than the positioner moving element for a prescribed distance, in other words, according to a wear amount of the friction pad 4. In this case also, in the positioning mechanism 280, the compressive deformation of the elastic member 281 becomes the retraction of the slide pin, in other words, the caliper body 51.

Further, in the disc brake device 201, when hydraulic oil is discharged from the hydraulic pressure chambers P1, P2, P3 and they are depressurized, the slide pin 71 and the positioner moving element 282 together retreat by the restoration force of the elastic member 281 that is compressed and deformed. During this retreating, in the positioning mechanism 280, the slide pin 71 and the positioner moving element 282 make no relative movement. Therefore, the slide pin 71 (caliper body 51) is returned for the maximum compressive deformation of the elastic member 281, and the disc rotor 2 is released from pressing by the friction pads 3, 4. In this case, in the relative positions of the slide pin 71 and the positioner moving element 282, the slide pin 71 has advanced by the wear amount of the friction pad 4 with respect to the original positional relationship, and the relative positions are changed according to the wear amount of the friction pad 4.

In the disc brake device 201 configured as described above, the swing variable mechanism 74 of the caliper slide mechanism 207 makes the permissible swing angle of the slide pin 71 variable in response to the braking action along with the slide movement of the caliper 5 and makes the permissible swing angle in the braking state larger than the permissible angle in the non-braking state. Accordingly, the disc brake device 201 can at the same time realize reduction of the rattle noise and reduction of the moan noise and can thus appropriately reduce noises.

In addition, in the positioning mechanism 280 of the caliper slide mechanism 207, the slide pin 71 and the positioner moving element 282 make relative movement when the hydraulic pressure chamber P3 is pressurized, the positioner moving element 282 advances, and the elastic member 281 reaches the maximum deformation. However, the slide pin 71 and the positioner moving element 282 are retracted for the maximum deformation of the elastic member 281 when the hydraulic pressure chamber P2 is depressurized. Accordingly, the positioning mechanism 280 can push back the slide pin 71 for the compressive deformation of the elastic member 281 regardless of the advancing distance of the slide pin 71.

Therefore, because the relative positions of the slide pin 71 and the sleeve 61 are changed by the positioning mechanism 280 according to the wear of the friction pad 4, the disc brake device 201 can appropriately sustain the position of the caliper body 51 and secure a stable retracting function. In other words, in the disc brake device 201, even when the friction pad 4 wears and the slide pin 71 and the sleeve 61 make relative movement, the slide pin 71 and the positioner moving element 282 are retracted for the maximum retraction. Accordingly, the relative positions of the slide pin 71 and the positioner moving element 282 is appropriately changed, and the caliper body can thereby be positioned in an appropriate position. Therefore, the disc brake device 201 can securely hold the caliper 5 in an appropriate position in the non-braking state and can thus securely reduce drag or the like of the friction pads 3, 4.

Further, in the disc brake device 201, the starting load of the caliper body 51 is set larger than the starting load of the piston 52. Therefore, when the hydraulic pressure chamber P1 is pressurized, the piston 52 advances to bring the friction pad 3 into contact with the disc rotor 2, and the caliper body thereafter advances to bring the friction pad 4 into contact with the disc rotor 2. Accordingly, the disc brake device 201 can appropriately secure the retraction of the caliper body 51.

In the disc brake device 201 and the caliper slide mechanism 207 in accordance with the embodiment described above, the swing variable mechanism 74 makes the guide length variable, makes the permissible swing angle variable, and thus makes the restraining condition of the slide pin 71 variable in response to the braking action along with the slide movement of the caliper 5, can thereby realize reduction of the rattle noise and reduction of the moan noise at the same time, and can thus appropriately reduce noises.

Further, in the disc brake device 201 and the caliper slide mechanism 207 in accordance with the embodiment described above, the caliper slide mechanism 207 has the positioning mechanism 280 that is capable of changing the relative positions of the sleeve 61 of the mounting 6 in which the fitting hole 62 is provided and the slide pin 71. Therefore, the disc brake device 201 and the caliper slide mechanism 207 can securely hold the caliper 5 in an appropriate position in the non-braking state by the positioning mechanism 280, can thus securely reduce drag or the like of the friction pads 3, 4, and can securely reduce a brake vibration, for example.

[Third Embodiment]

Figure 7:
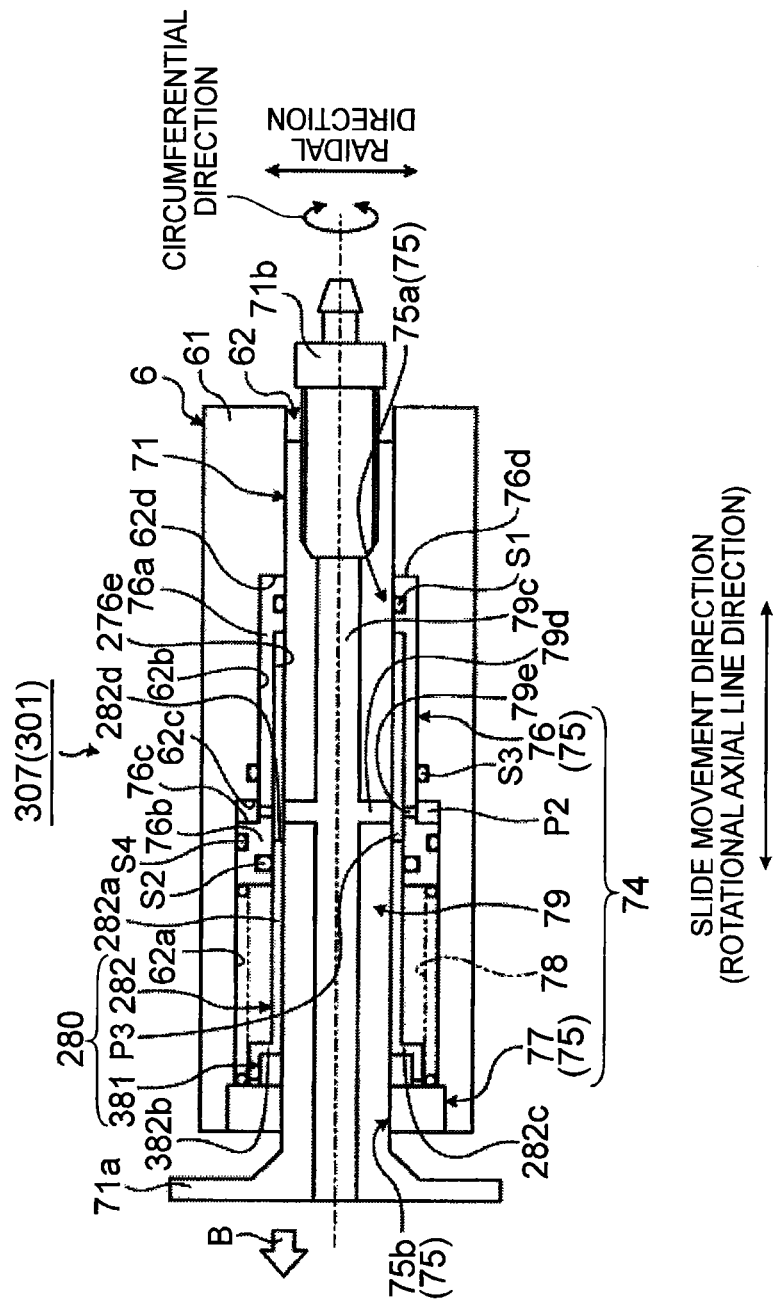
FIG. 7 is a cross-sectional view along a slide movement direction of a caliper slide mechanism in accordance with a third embodiment.

FIG. 7 is a cross-sectional view along a slide movement direction of a caliper slide mechanism in accordance with a third embodiment. A disc brake device and a caliper slide mechanism in accordance with the third embodiment differ from the second embodiment in a configuration of the positioning mechanism.

A caliper slide mechanism 307 of a disc brake device 301 of this embodiment is configured to include the fitting hole 62, the slide pin 71, the fixing bolt 72 (see FIG. 1 and so forth), and the boot 73 (see FIG. 1 and so forth), the swing variable mechanism 74, and the positioning mechanism 280. The positioning mechanism 280 is configured to include an elastic member 381, the positioner moving element 282 as the positioning mechanism moving element, and the hydraulic pressure chamber P3.

The outer diameter of a pressing section 382b of the positioner moving element 282 of this embodiment is smaller than the inner diameter of the spring 78. Further, in the pressing section 382b of this embodiment, an annular section formed in an annular shape (ring shape) and a cylindrical section in a cylindrical shape that protrudes from an outer end section of the annular section toward the fixing member 77 are integrally formed. In the positioner moving element 282, an end surface of the annular section of the pressing section 382b in the advancing direction in the slide movement direction forms the pressing surface 282c. In addition, the outer diameter of an elastic member 381 of this embodiment is smaller than the inner diameter of the spring 78. The elastic member 381 is interposed between the pressing surface 282c of the positioner moving element 282 and the fixing member 77 in the slide movement direction.

Further, the spring 78 of this embodiment is arranged between the guide moving element 76 and the fixing member 77 in the slide movement direction. One end section of the spring 78 contacts with the fixing member 77, and the other end section contacts with the pressure receiving section 76b of the guide moving element 76, thereby urging the guide moving element 76 in the retreating direction. In other words, the reaction force by the urging force of the spring 78 (spring set load) does not act on the positioner moving element 282 or the elastic member 381.

In this case, in the positioning mechanism 280, the spring set load does not act on the elastic member 381, and the elastic member 381 and the like are not restrained by the spring 78. Therefore, in the disc brake device 301, when hydraulic oil is discharged from the hydraulic pressure chambers P1, P2, P3, they are depressurized, and the slide pin 71, the guide moving element 76, and the positioner moving element 282 move to the retreat side, the positioner moving element 282 tends to move prior to the guide moving element 76.

In the disc brake device 301 and the caliper slide mechanism 307 in accordance with the embodiment described above as well, the swing variable mechanism 74 makes the guide length variable, makes the permissible swing angle variable, and thus makes the restraining condition of the slide pin 71 variable in response to the braking action along with the slide movement of the caliper 5, can thereby realize reduction of the rattle noise and reduction of the moan noise at the same time, and can thus appropriately reduce noises.

In addition, in the disc brake device 301 and the caliper slide mechanism 307 can also securely hold the caliper 5 in an appropriate position in the non-braking state by the positioning mechanism 280, can thus securely reduce drag or the like of the friction pads 3, 4, and can securely reduce a brake vibration, for example.

[Fourth Embodiment]

Figure 8:
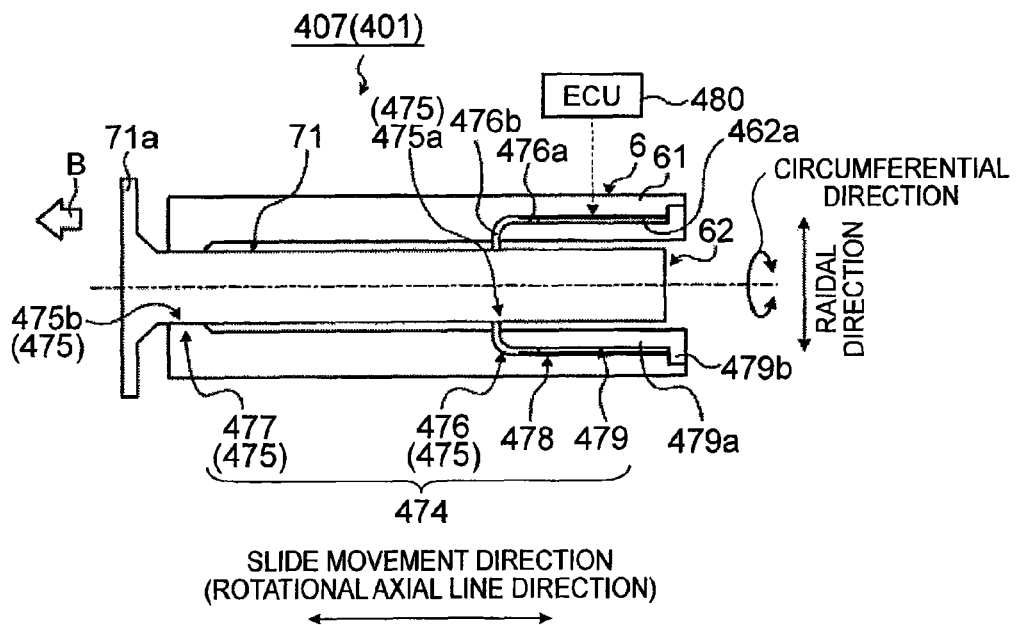
FIG. 8 is a cross-sectional view along a slide movement direction of a caliper slide mechanism in accordance with a fourth embodiment.
Figure 9:
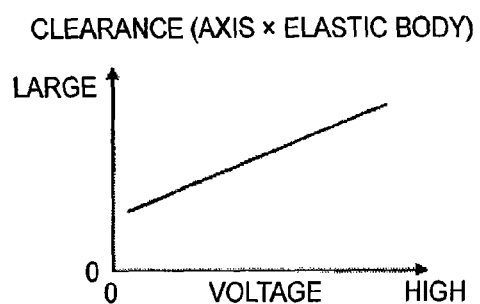
FIG. 9 is a graph for representing an example of the relationship between voltage and clearance in the caliper slide mechanism in accordance with the fourth embodiment.

FIG. 8 is a cross-sectional view along a slide movement direction of a caliper slide mechanism in accordance with a fourth embodiment, and FIG. 9 is a graph for representing an example of the relationship between voltage and clearance in the caliper slide mechanism in accordance with the fourth embodiment. A disc brake device and a caliper slide mechanism in accordance with the fourth embodiment differ from the first to third embodiments in a configuration of the variable mechanism.

As shown in FIG. 8, a caliper slide mechanism 407 of a disc brake device 401 of this embodiment has a swing variable mechanism 474 as the variable mechanism and is intended to thereby reduce noises. In other words, the swing variable mechanism 474 makes variable the permissible swing angle of the slide pin 71 in response to the braking action along with the slide movement of the caliper 5, and the caliper slide mechanism 407 thereby appropriately reduces various noises.

The swing variable mechanism 474 is configured to include a guide section 475 as a structure for making the permissible swing angle variable. In the swing variable mechanism 474, the guide section 475 changes in response to the braking action, thereby changing the mode of guidance. Accordingly, the swing variable mechanism 474 makes the permissible swing angle variable.

The guide section 475 is provided in the fitting hole 62. The guide section 475 has two support parts 475a, 475b that support at least both the end portions of the slide pin 71. In the guide section 475, the support part 475a supports the end section of the slide pin 71 on the distal end section side, and the support part 475b supports the end section of the slide pin 71 on the base end section 71a side, thereby guiding the slide movement of the slide pin 71.

Further, the swing variable mechanism 474 of this embodiment changes a clearance in a prescribed position to make the permissible angle variable. The clearance in the prescribed position that the swing variable mechanism 474 makes variable is a clearance between one of the two support parts 475a and 475b, here, the support part 475a and the slide pin 71 in the radial direction. The swing variable mechanism 474 makes the clearance in the braking state wider than the clearance in the non-braking state. In other words, the swing variable mechanism 474 is a clearance variable mechanism that makes the clearance between the support part 475a and the slide pin 71, thereby making the permissible swing angle variable.

More specifically, the swing variable mechanism 474 is configured to include an elastic body 476, a fixing section 477, a piezoelectric element 478, and an assembling member 479. Portions of the elastic body 476 and the fixing section 477 constitute the above-described guide section 475.

The elastic body 476 is provided with one of the two support parts 475a, 475b, here, the support part 475a. The fixing section 477 is provided with the other of the two support parts 475a, 475b, here, the support part 475b.

The elastic body 476 is provided in the fitting hole 62 provided in the sleeve 61.

Here, a housing groove 462a is formed in the inner peripheral surface of the fitting hole 62. The housing groove 462a is integral in the circumferential direction of the fitting hole 62 and is formed in a prescribed length along the slide movement direction. In other words, the housing groove 462a is formed as a column-shaped space. The housing groove 462a opens in the retreating direction of the slide pin 71 (caliper 5) in the fitting hole 62.

The elastic body 476 is configured to include a main body section 476a and a support section 476b. The main body section 476a is formed in a cylindrical shape. The support section 476b is provided in one end section of the main body section 476a. The support section 476b is formed in an annular shape (ring shape). In the elastic body 476, the main body section 476a and the support section 476b are integrally formed. The elastic body 476 is formed of an elastic material such as rubber.

The main body section 476a of the elastic body 476 is inserted in the housing groove 462a. In the elastic body 476, the support section 476b is positioned in the advancing direction (the direction of arrow B in FIG. 8) of the slide pin 71 (caliper 5) in the housing groove 462a, and the main body section 476a is positioned in the retreating direction.

More specifically, in the elastic body 476, the main body section 476a is positioned in the housing groove 462a, and the support section 476b protrudes inward in the radial direction. Further, in the elastic body 476, an outer peripheral surface of the main body section 476a faces an inner peripheral surface of the housing groove 462a in the radial direction, and an inside end section of the main body section 476a in the radial direction faces the outer peripheral surface of the slide pin 71 in the radial direction.

The fixing section 477 is formed in an annular shape (ring shape). The inner diameter of the fixing section 477 is slightly larger than the outer diameter of the slide pin 71. The fixing section 477 is fixed to an opening of the fitting hole 62 in the advancing direction (the direction of arrow B in FIG. 8). Here, the fixing section 477 is integrally formed with the sleeve 61.

The piezoelectric element 478 converts a voltage applied to a piezoelectric body into force. The piezoelectric element 478 is interposed between the main body 476a and the inner peripheral surface of the housing groove 462a in the radial direction. Further, the piezoelectric element 478 is electrically connected to a control device, for example, an ECU 480 that controls each section of the vehicle in which the disc brake device 401 is provided. A prescribed voltage is applied to the piezoelectric element 478 from the ECU 480 in response to the braking action.

The assembling member 479 is configured to include a main body section 479a and a support section 479b. The main body section 479a is formed in a cylindrical shape. The support section 479b is provided in one end section of the main body section 479a. The support section 479b is formed in an annular shape (ring shape). In the assembling member 479, the main body section 479a and the support section 479b are integrally formed. The assembling member 479 is assembled such that the main body section 479a is inserted from an opening of the housing groove 462a in the retreating direction and the support section 479b is fixed to an inner wall surface of the housing groove 462a. In this state, the assembling member 479 forms a space between the main body section 479a and the inner wall surface of the housing groove 462a, and the above-described elastic body 476 and the piezoelectric element 478 are housed and assembled in the space.

Further, the support part 475a is configured with the support section 476b of the elastic body 476 in the guide section 475 of the swing variable mechanism 474. Moreover, the support part 475b is configured with the inner peripheral surface of the fixing section 477 in the guide section 475. In the swing variable mechanism 474, a clearance between the support part 475b in the fixing section 477 and the slide pin 71 is fixed. The clearance between the support part 475b and the slide pin 71 is set as small as possible in a range that permits the slide movement of the slide pin 71.

On the other hand, in the swing variable mechanism 474, a clearance between the support part 475a in the support section 476b and the slide pin 71 is variable. Accordingly, the swing variable mechanism 474 can permit the slide pin 71 to swing with respect to the slide movement direction with the support part 475b being a reference. In this case, the permissible swing angle of the slide pin 71 with respect to the slide movement direction is determined according to the clearance between the support part 475a and the slide pin 71 and a guide length (an interval between the support part 475a and the support part 475b along the slide movement direction).

The swing variable mechanism 474 changes the clearance between the support part 475a and the slide pin 71 by changing the voltage supplied to the piezoelectric element 478 by the ECU 480 in response to the braking action to deform one of the two support parts 475a, 475b, here, the support part 475a.

In the swing variable mechanism 474, when the applied voltage to the piezoelectric element 478 is controlled to relatively decrease by the ECU 480, the elastic body 476 shrinks inward in the radial direction, and the clearance between the support part 475a and the slide pin 71 is relatively narrowed. On the other hand, in the swing variable mechanism 474, when the applied voltage to the piezoelectric element 478 is controlled to relatively increase by the ECU 480, the elastic body 476 swells outward in the radial direction by the force from the piezoelectric element 478, and the clearance between the support part 475a and the slide pin 71 is relatively widened. FIG. 9 represents an example of the relationship between the applied voltage to the piezoelectric element 478 and the clearance between the support part 475a and the slide pin 71. In FIG. 9, the clearance between the support part 475a and the slide pin 71 becomes wider as the applied voltage to the piezoelectric element 478 becomes higher.

As a result, the swing variable mechanism 474 makes the clearance between the support part 475a and the slide pin 71 variable in response to the braking action along with the slide movement of the caliper 5 as described above, thereby making the permissible swing angle of the slide pin 71 variable in response to the braking action along with the slide movement of the caliper 5. That is, the swing variable mechanism 474 makes the permissible swing angle in the braking state larger than the permissible swing angle in the non-braking state by making the clearance between the support part 475a and the slide pin 71 in the braking state wider than the clearance between the support part 475a and the slide pin 71 in the non-braking state.

In the swing variable mechanism 474 configured as described above, the applied voltage to the piezoelectric element 478 is controlled by the ECU 480 according to brake control such as a pedaling operation on the brake pedal by the driver or so-called ABS control, for example. The ECU 480 detects presence or absence or the like of brake control such as a pedaling operation on the brake pedal by the driver or ABS control, for example, on the basis of detection results of a brake pedal sensor, brake hydraulic pressure sensor, and the like and controls the applied voltage to the piezoelectric element 478 according to the detection.

When the ECU 480 detects a pedaling operation on the brake pedal by the driver or the like, for example, on the basis of the detection results of the brake pedal sensor, the brake hydraulic pressure sensor, and the like, the ECU 480 relatively increases the applied voltage to the piezoelectric element 478 according to the detection. Therefore, in the swing variable mechanism 474, the clearance between the support part 475a and the slide pin 71 relatively increases in the braking state, swing of the slide pin 71 with respect to the slide movement direction is permitted, and the permissible swing angle relatively increases.

Further, when the ECU 480 detects release of the brake pedal from a pedaling operation by the driver or the like, for example, on the basis of the detection results of the brake pedal sensor, the brake hydraulic pressure sensor, and the like, the ECU 480 relatively reduces the applied voltage to the piezoelectric element 478 according to the detection. Therefore, in the swing variable mechanism 474, the clearance between the support part 475a and the slide pin 71 is relatively narrowed in the non-braking state, swing of the slide pin 71 with respect to the slide movement direction is restrained, and the permissible swing angle relatively decreases.

The disc brake device 401 and the caliper slide mechanism 407 in accordance with the embodiment described above also make the permissible swing angle variable, thus make the restraining condition of the slide pin 71 variable in response to the braking action along with the slide movement of the caliper 5, can thereby realize reduction of the rattle noise and reduction of the moan noise at the same time, and can thus appropriately reduce noises.

That is, in the disc brake device 401 and the caliper slide mechanism 407 in accordance with the embodiment described above, the guide section 475 has the support parts 475a, 475b that support both the ends of the slide pin 71 and guide the slide movement of the slide pin 71, and the swing variable mechanism 474 makes the permissible swing angle variable by changing at least the clearance between the support part 475a of the guide section 475 and the slide pin 71 to make the clearance in the braking state where the friction pad 4 is pressed to the friction surface of the disc rotor 2 wider than the clearance in the non-braking state where the friction pad 4 is separated from the friction surface of the disc rotor 2. Accordingly, regardless of the brake hydraulic pressure or the like, the swing variable mechanism 474 makes the permissible swing angle in the braking state larger than the permissible swing angle in the non-braking state, and the disc brake device 401 and the caliper slide mechanism 407 can thus appropriately reduce noises.

[Fifth Embodiment]

Figure 10:
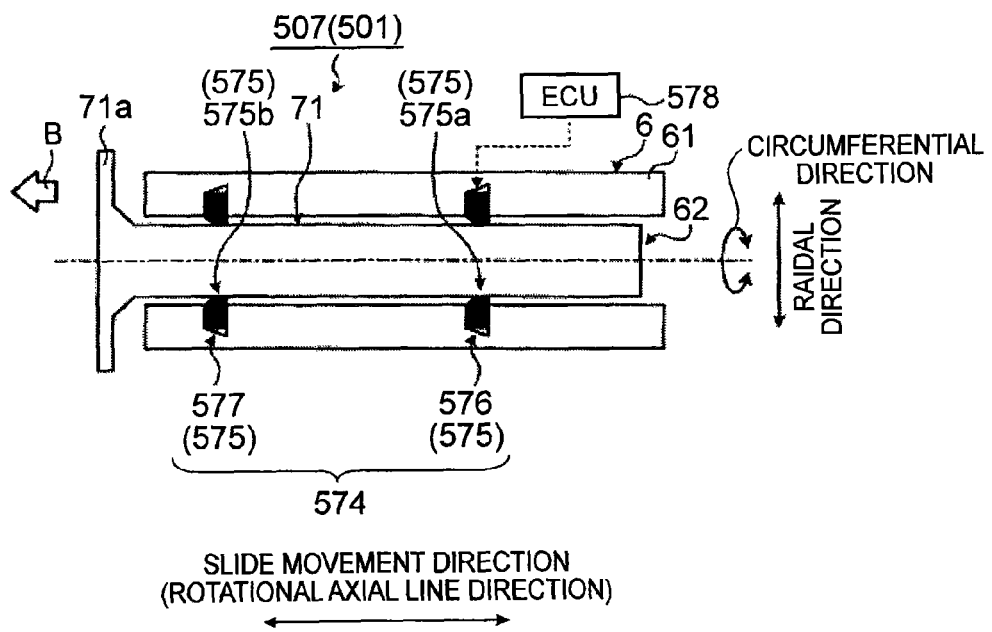
FIG. 10 is a cross-sectional view along a slide movement direction of a caliper slide mechanism in accordance with a fifth embodiment.
Figure 11:
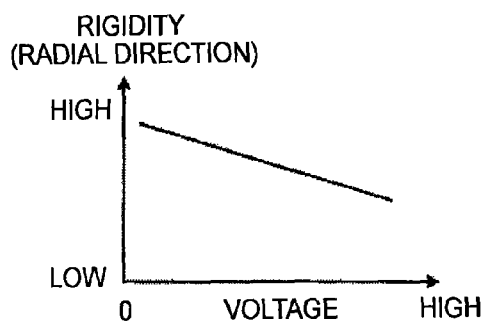
FIG. 11 is a graph for representing an example of the relationship between voltage and rigidity (radial direction) in the caliper slide mechanism in accordance with the fifth embodiment.

FIG. 10 is a cross-sectional view along a slide movement direction of a caliper slide mechanism in accordance with a fifth embodiment, and FIG. 11 is a graph for representing an example of the relationship between voltage and rigidity (radial direction) in the caliper slide mechanism in accordance with the fifth embodiment. A disc brake device and the caliper slide mechanism in accordance with the fifth embodiment differ from the first to fourth embodiments in a configuration of the variable mechanism.

As shown in FIG. 10, a caliper slide mechanism 507 of a disc brake device 501 of this embodiment has a swing variable mechanism 574 as the variable mechanism and is intended to thereby reduce noises. In other words, the swing variable mechanism 574 makes the permissible swing angle of the slide pin 71 variable in response to the braking action along with the slide movement of the caliper 5, and the caliper slide mechanism 507 thereby appropriately reduces various noises.

The swing variable mechanism 574 is configured to include a guide section 575 as a structure for making the permissible swing angle variable. In the swing variable mechanism 574, the guide section 575 changes in response to the braking action, thereby changing the mode of guidance. Accordingly, the swing variable mechanism 574 makes the permissible swing angle variable.

The guide section 575 is provided in the fitting hole 62. The guide section 575 has two support parts 575a, 575b that support at least both the end portions of the slide pin 71. In the guide section 575, the support part 575a supports the end section of the slide pin 71 on the distal end section side, and the support part 575b supports the end section of the slide pin 71 on the base end section 71a side, thereby guiding the slide movement of the slide pin 71.

Further, the swing variable mechanism 574 of this embodiment makes the permissible swing angle by changing the rigidity of at least one of the two support parts 575a, 575b of the guide section 575, here, the support part 575a. The swing variable mechanism 574 makes the rigidity of the support part 575a in the braking state lower than the rigidity of the support part 575a in the non-braking state. In other words, the swing variable mechanism 574 is a rigidity variable mechanism that makes the rigidity of the support part 575a, thereby making the permissible swing angle variable.

More specifically, the swing variable mechanism 574 is configured to include a support part 576 and a support member 577. Portions of the support part 576 and the support member 577 constitute the above-described guide section 575.

The support part 576 is provided with one of the two support parts 575a, 575b, here, the support part 575a. The support member 577 is provided with one of the two support parts 575a, 575b, here, the support part 575b.

The support part 576 and the support member 577 are provided in the fitting hole 62 provided in the sleeve 61. The support part 576 is provided in a ring-shaped circumferential groove formed along the inner peripheral surface of the fitting hole 62 on the distal end section side of the slide pin 71. The support part 576 is formed in a ring shape, and an inside end section thereof in the radial direction contacts with the outer peripheral surface of the slide pin 71. The support member 577 is provided in a ring-shaped circumferential groove formed along the inner peripheral surface of the fitting hole 62 on the base end section 71a side of the slide pin 71. The support member 577 is formed in a ring shape, and an inside end section thereof in the radial direction contacts with the outer peripheral surface of the slide pin 71.

Further, the support part 576 is formed of various elastic modulus variable material. An elastic modulus variable material is a polymeric material or the like having a function to change the elastic modulus, in other words, the rigidity by application of an external electric field. The susceptibility to deformation of the support part 576 is changed by applying electric potential, the rigidity (spring constant) thereof changes, and the displacement with respect to acting force increases. The support part 576 is electrically connected to a control device, for example, an ECU 578 that controls each section of the vehicle in which the disc brake device 501 is provided. A prescribed voltage is applied to the support part 576 from the ECU 578 in response to the braking action, and the rigidity of the support part 575a is made variable.

The support part 575a is configured with the support part 576 in the guide section 575 in the swing variable mechanism 574. Further, the support part 575b is configured with the support member 577 in the guide section 575. In the swing variable mechanism 574, a clearance between the support part 575b in the support member 577 and the slide pin 71 is set as small as possible in a range that permits the slide movement of the slide pin 71.

On the other hand, in the swing variable mechanism 574, the rigidity (elastic modulus) of the support part 575a in the support part 576 is variable. Accordingly, the swing variable mechanism 574 can permit the slide pin 71 to swing with respect to the slide movement direction with the support part 575b being a reference. In other words, the rigidity of the support part 575a is relatively reduced, thereby facilitating the elastic deformation of the support part 575a in response to swing of the slide pin 71.

The swing variable mechanism 574 can thereby further permit the swing. On the other hand, the rigidity of the support part 575a is relatively increased, thereby hindering the elastic deformation of the support part 575a in response to swing of the slide pin 71. The swing variable mechanism 574 can thereby restrain the swing of the slide pin 71.

The swing variable mechanism 574 changes the degree of restraint of the slide pin 71 by the support part 575a by changing the supplied voltage to the support part 576 by the ECU 578 in response to the braking action to change the support part 575a.

In the swing variable mechanism 574, when the ECU 578 controls to relatively reduce the applied voltage to the support part 576, the rigidity of the support part 575a becomes relatively high, and the deformation thereof with respect to swing of the slide pin 71 becomes relatively small. On the other hand, in the swing variable mechanism 574, when the ECU 578 controls to relatively increase the applied voltage to the support part 576, the rigidity of the support part 575a becomes relatively low, and the deformation thereof with respect to swing of the slide pin 71 becomes relatively large. FIG. 11 represents an example of the relationship between the applied voltage to the support part 576 and the rigidity (radial direction) of the support part 575a. In FIG. 11, the rigidity of the support part 575a becomes smaller as the applied voltage to the support part 576 becomes higher.

As a result, the swing variable mechanism 574 makes the rigidity of the support part 575a variable in response to the braking action along with the slide movement of the caliper 5 as described above, thereby making the permissible swing angle of the slide pin 71 variable. In other words, the swing variable mechanism 574 makes the rigidity of the support part 575*a* in the braking state lower than the rigidity of the support part 575*a* in the non-braking state, thereby making the permissible swing angle in the braking state larger than the permissible swing angle in the non-braking state.

In the swing variable mechanism 574 configured as described above, the applied voltage to the support part 576 is controlled by the ECU 578 according to brake control such as a pedaling operation on the brake pedal by the driver or so-called ABS control, for example. The ECU 578 detects presence or absence or the like of brake control such as a pedaling operation on the brake pedal by the driver or ABS control, for example, on the basis of detection results of a brake pedal sensor, brake hydraulic pressure sensor, and the like and controls the applied voltage to the support part 576 according to the detection.

When the ECU 578 detects a pedaling operation on the brake pedal by the driver or the like, for example, on the basis of the detection results of the brake pedal sensor, the brake hydraulic pressure sensor, and the like, the ECU 578 relatively increases the applied voltage to the support part 576 according to the detection. Therefore, in the swing variable mechanism 574, the rigidity of the support part 575*a* relatively decreases in the braking state, swing of the slide pin 71 with respect to the slide movement direction is permitted, and the permissible swing angle relatively increases.

Further, when the ECU 578 detects release of the brake pedal from a pedaling operation by the driver or the like, for example, on the basis of the detection results of the brake pedal sensor, the brake hydraulic pressure sensor, and the like, the ECU 578 relatively reduces the applied voltage to support part 576 according to the detection. Therefore, in the swing variable mechanism 574, the rigidity of the support part 575*a* relatively increases in the braking state, swing of the slide pin 71 with respect to the slide movement direction is restrained, and the permissible swing angle relatively decreases.

The disc brake device 501 and the caliper slide mechanism 507 in accordance with the embodiment described above also make the permissible swing angle variable, thus make the restraining condition of the slide pin 71 variable in response to the braking action along with the slide movement of the caliper 5, can thereby realize reduction of the rattle noise and reduction of the moan noise at the same time, and can thus appropriately reduce noises.

That is, in the disc brake device 501 and the caliper slide mechanism 507 in accordance with the embodiment described above, the guide section 575 has the support parts 575*a*, 575*b* that support both the ends of the slide pin 71 and guide the slide movement of the slide pin 71, and the swing variable mechanism 574 makes the permissible swing angle variable by changing the rigidity of the support part 575*a* of the guide section 575 to make the rigidity in the braking state where the friction pad 4 is pressed to the friction surface of the disc rotor 2 lower than the rigidity in the non-braking state where the friction pad 4 is separated from the friction surface of the disc rotor 2. Accordingly, regardless of the brake hydraulic pressure or the like, the swing variable mechanism 574 makes the permissible swing angle in the braking state larger than the permissible swing angle in the non-braking state, and the disc brake device 501 and the caliper slide mechanism 507 can thus appropriately reduce noises.

The disc brake device and the caliper slide mechanism in accordance with the above-described embodiments of the present invention is not limited to the above-described embodiments but can be variously modified within the scope of the claims. The disc brake device and the caliper slide mechanism in accordance with this embodiment may be configured by combining the plurality of above-described embodiments.

An entire structure of the swing variable mechanism described above may be configured with an elastic body. Further, the positioning mechanism described above is not limited to the modes described above.

The caliper slide mechanism described above is described such that the caliper is supported by the mounting in a manner enabling slide movement via the slide pin inserted in the guide section provided in a hole section of the mounting; however, the present invention is not limited thereto. The caliper slide mechanism may be configured such that the caliper is supported by the mounting in a manner enabling slide movement via the slide pin inserted in the guide section provided in a hole section of the caliper. In this case, the slide pin is assembled to the mounting.

DESCRIPTION OF REFERENCE NUMERALS AND SYMBOLS

1, 201, 301, 401, 501: disc brake device
2: disc rotor
3, 4: friction pad
5: caliper
6: mounting
7, 207, 307, 407, 507: caliper slide mechanism
51: caliper body
61: sleeve
62: fitting hole (hole section)
71: slide pin
74, 474, 574: swing variable mechanism (variable mechanism)
75*a*, 75*b*, 475*a*, 475*b*, 575*a*, 575*b*: support part
75, 475, 575: guide section
76: guide moving element (variable mechanism moving element)
77: fixing member
78: spring
79: communication path
280: positioning mechanism
281, 381: elastic member
282: positioner moving element (positioning mechanism moving element)
476: elastic body
477: piezoelectric element
479: assembling member
480, 578: ECU
576, 577: support member
P1: hydraulic pressure chamber (pressing pressure chamber)
P2: hydraulic chamber (variable mechanism pressure chamber)
P3: hydraulic pressure chamber (positioning mechanism pressure chamber)
S1, S2, S3, S4: seal member

The invention claimed is:
1. A disc brake device comprising:
a disc rotor which rotates around a rotational axial line;
a friction pad which faces a friction surface of the disc rotor;
a caliper which is capable of pressing the friction pad to the friction surface of the disc rotor;
a mounting in which the caliper is provided; and a caliper slide mechanism which supports the caliper on the mounting in a manner enabling slide movement via a slide pin inserted in a guide section provided in a hole section of the caliper or the mounting, wherein the caliper slide mechanism has a variable mechanism which makes a permissible swing angle of the slide pin with respect to a slide movement direction variable in response to a braking action along with slide movement of the caliper, wherein the guide section has two support parts that support both end sections of the slide pin to guide slide movement of the slide pin, wherein the variable mechanism makes the permissible swing angle variable by changing an interval between the two support parts of the guide section along the slide movement direction and makes the interval in the braking state where the friction pad is pressed to the friction surface of the disc rotor shorter than the interval in the non-braking state where the friction pad is separated from the friction surface of the disc rotor, and wherein the variable mechanism has a variable mechanism moving element in which one of the two support parts is provided and a variable mechanism pressure chamber which is supplied with a hydraulic medium and generates force to make the variable mechanism moving element approach the other of the two support parts.

2. The disc brake device according to claim 1, wherein the variable mechanism makes the permissible swing angle in a braking state where the friction pad is pressed to the friction surface of the disc rotor larger than the permissible swing angle in a non-braking state where the friction pad is separated from the friction surface of the disc rotor.

3. The disc brake device according to claim 1, wherein in the variable mechanism, one of the support parts provided in the variable mechanism moving element elastically supports the slide pin, and a clearance between the variable mechanism moving element and the slide pin is larger than a clearance between the other support part and the slide pin.

4. The disc brake device according to claim 1, wherein the variable mechanism has a communication path which allows a pressing pressure chamber which is supplied with the hydraulic medium and generates force to press the friction pad to the friction surface of the disc rotor and the variable mechanism pressure chamber to communicate with each other via an inside of the slide pin.

5. The disc brake device according to claim 1, wherein the caliper slide mechanism has a positioning mechanism which is capable of changing relative positions of a sleeve in which the hole section is provided and the slide pin.

6. The disc brake device according to claim 5, wherein the positioning mechanism has: a elastic member which is interposed between the slide pin and the sleeve and is capable of compressive deformation in a braking state where the friction pad is pressed to the friction surface of the disc rotor; a positioning mechanism moving element which is interposed between the slide pin and the sleeve and is moveable along the slide movement direction following deformation of the elastic member; and a positioning mechanism pressure chamber which is supplied with a hydraulic medium which generates force to press the friction pad to the friction surface of the disc rotor and generates force to move the positioning mechanism moving element along the slide movement direction, and permits relative movement between the slide pin and the positioning mechanism moving element or between the sleeve and the positioning mechanism moving element when compressive deformation of the elastic member reaches a preset prescribed value to change relative positions of the slide pin and the sleeve.

7. A disc brake device comprising:

a disc rotor which rotates around a rotational axial line;

a friction pad which faces a friction surface of the disc rotor;

a caliper which is capable of pressing the friction pad to the friction surface of the disc rotor:

a mounting in which the caliper is provided; and a caliper slide mechanism which supports the caliper on the mounting in a manner enabling slide movement via a slide pin inserted in a guide section provided in a hole section of the caliper or the mounting, wherein the caliper slide mechanism has a variable mechanism which makes a permissible swing angle of the slide pin with respect to a slide movement direction variable in response to a braking action along with slide movement of the caliper, wherein the guide section has two support parts that support both end sections of the slide pin to guide slide movement of the slide pin, and wherein the variable mechanism makes the permissible swing angle by changing a clearance between at least one of the two support parts of the guide section and the slide pin and makes the clearance in the braking state where the friction pad is pressed to the friction surface of the disc rotor wider than the clearance in the non-braking state where the friction pad is separated from the friction surface of the disc rotor.

8. A disc brake device comprising:

a disc rotor which rotates around a rotational axial line;

a friction pad which faces a friction surface of the disc rotor;

a caliper which is capable of pressing the friction pad to the friction surface of the disc rotor;

a mounting in which the caliper is provided; and a caliper slide mechanism which supports the caliper on the mounting in a manner enabling slide movement via a slide pin inserted in a guide section provided in a hole section of the caliper or the mounting, wherein the caliper slide mechanism has a variable mechanism which makes a permissible swing angle of the slide pin with respect to a slide movement direction variable in response to a braking action along with slide movement of the caliper, wherein the guide section has two support parts that support both end sections of the slide pin to guide slide movement of the slide pin, and wherein the variable mechanism makes the permissible swing angle variable by changing rigidity of at least one of the two support parts of the guide section and makes the rigidity in the braking state where the friction pad is pressed to the friction surface of the disc rotor lower than the rigidity in the non-braking state where the friction pad is separated from the friction surface of the disc rotor.

9. A caliper slide mechanism, wherein a caliper is supported by a mounting in a manner enabling slide movement via a slide pin inserted in a guide section provided in a hole section of the caliper or the mounting, wherein the caliper slide mechanism has a variable mechanism which makes a permissible swing angle of the slide pin with respect to a slide movement direction variable in response to a braking action along with the slide movement of the caliper, and wherein the caliper slide mechanism has a positioning mechanism which is capable of changing relative positions of a sleeve in which the hole section is provided and the slide pin.

* * * * *